United States Patent
Sharma et al.

(10) Patent No.: US 12,267,874 B2
(45) Date of Patent: Apr. 1, 2025

(54) COMMUNICATIONS DEVICE, INFRASTRUCTURE EQUIPMENT AND METHODS

(71) Applicant: Sony Group Corporation, Tokyo (JP)

(72) Inventors: Vivek Sharma, Basingstoke (GB); Yassin Aden Awad, Basingstoke (GB); Yuxin Wei, Basingstoke (GB); Hideji Wakabayashi, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 372 days.

(21) Appl. No.: 17/785,400

(22) PCT Filed: Jan. 4, 2021

(86) PCT No.: PCT/EP2021/050018
§ 371 (c)(1),
(2) Date: Jun. 15, 2022

(87) PCT Pub. No.: WO2021/144156
PCT Pub. Date: Jul. 22, 2021

(65) Prior Publication Data
US 2023/0041305 A1    Feb. 9, 2023

(30) Foreign Application Priority Data
Jan. 15, 2020 (EP) .................................... 20152077

(51) Int. Cl.
*H04W 74/0833* (2024.01)
*H04L 1/00* (2006.01)
*H04W 28/06* (2009.01)

(52) U.S. Cl.
CPC ....... *H04W 74/0833* (2013.01); *H04L 1/0003* (2013.01); *H04W 28/06* (2013.01)

(58) Field of Classification Search
None
See application file for complete search history.

(56) References Cited

U.S. PATENT DOCUMENTS

2013/0070696 A1* 3/2013 Tang ................... H04W 52/362
                                                370/329
2019/0166632 A1* 5/2019 Byun ................... H04L 5/0037
(Continued)

FOREIGN PATENT DOCUMENTS

EP       3506708 A1      7/2019
WO   WO-2020199022 A1 * 10/2020

OTHER PUBLICATIONS

International Search Report and Written Opinion mailed on Mar. 31, 2021, received for PCT Application PCT/EP2021/050018, filed on Jan. 4, 2021, 12 pages.
(Continued)

*Primary Examiner* — Kenny S Lin
(74) *Attorney, Agent, or Firm* — XSENSUS, LLP

(57) ABSTRACT

A method of transmitting data by a communications device in a wireless communications network is disclosed. The method comprises determining an amount of uplink data to be transmitted by the communications device to the wireless communications network, and either transitioning to a connected state if the determined amount of the uplink data is greater than a first threshold (Y3) or, if the determined amount of the uplink data is less than the first threshold (Y3) selecting a random access preamble from one of a plurality of groups of random access preambles, selecting modulation and coding for transmitting the uplink data, and transmitting a random access message on a wireless access interface to the wireless communications network as part of a random access procedure.

19 Claims, 13 Drawing Sheets

(56) References Cited

U.S. PATENT DOCUMENTS

| | | | |
|---|---|---|---|
| 2019/0320467 A1* | 10/2019 | Freda | H04W 74/004 |
| 2019/0357174 A1* | 11/2019 | Zhao | H04L 27/261 |
| 2020/0229111 A1* | 7/2020 | Kim | H04W 76/27 |
| 2022/0287108 A1* | 9/2022 | Takahashi | H04W 74/0833 |
| 2022/0312501 A1* | 9/2022 | Lei | H04L 1/1867 |

OTHER PUBLICATIONS

Qualcomm Inc., "NR-based Access to Unlicensed Spectrum", 3GPP TSG RAN Meeting #82, RP-182878, Dec. 10-13, 2018, 7 pages.

ZTE Corporation et al., "New work item: 2-step RACH for NR" 3GPP TSG RAN Meeting #82, RP-182894, Dec. 10-13, 2018, 5 pages.

Nokia et al., "Revised WID: Support of NR Industrial Internet of Things (IoT)", 3GPP TSG RAN Meeting #85, RP-192324, Sep. 16-20, 2019, 6 pages.

ZTE Corporation, "Revised work item proposal: 2-step RACH for NR", 3GPP TSG RAN Meeting #85, RP-192330, Sep. 16-20, 2019, 4 pages.

ZTE, "Work Item on NR smalldata transmissions in Inactive state", 3GPP TSG RAN Meeting #86, RP-193168, Dec. 9-12, 2019, 4 pages.

3GPP, "NR; Medium Access Control (MAC) protocol specification (Release 15)", 3GPP TS 38.321 V15.3.0, Sep. 2018, pp. 1-76.

Ericsson, "PUSCH selection and MsgA payloads in 2-step RA", 3GPP TSG-RAN WG2 #107bis, R2-1912682, Oct. 14-18, 2019, 4 pages.

Holma et al., "LTE for UMTS OFDMA and SC-FDMA Based Radio Access", John Wiley & Sons, 2009, 232 pages.

Huawei, "UL data transmission without RRC signalling without initiating transition to active (option A)", 3GPP TSG-RAN NR Adhoc, R2-1700185, Nov. 14-18, 2016, pp. 1-25.

Interdigital Communications, "UL and DL Data Transmission Procedures in Inactive State", 3GPP TSG-RAN WG2 #97, R2-1701191, Feb. 13-17, 2017, pp. 1-4.

Nokia et al., "Revised SID: Study on NR Industrial Internet of Things (IoT)", 3GPP TSG RAN meeting #81, RP-182090, Sep. 10-13, 2018, 5 pages.

Qualcomm Inc., "Revised WID on NR-based Access to Unlicensed Spectrum", 3GPP TSG RAN Meeting #84, RP-191575, Jun. 3-6, 2019, 8 pages.

Sony, "PUSCH Configurations for MsgA of 2-step RACH", 3GPP TSG-RAN WG2 Meeting #107, R2-1909906, Aug. 26-30, 2019, 3 pages.

Sony, "Channel Structure for Two-Step RACH", 3GPP TSG RAN WG1 Meeting #98bis, R1-1910743, Oct. 14-20, 2019, 4 pages.

* cited by examiner

COMMUNICATIONS DEVICE, INFRASTRUCTURE EQUIPMENT AND METHODS

CROSS-REFERENCE TO RELATED APPLICATIONS

The present application is based on PCT filing PCT/EP2021/050018, filed Jan. 4, 2021, which claims priority to EP 20152077.2, filed Jan. 15, 2020, the entire contents of each are incorporated herein by reference.

BACKGROUND

Field

The present disclosure relates to communications devices, infrastructure equipment and methods for transmitting data in a wireless communications network.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to support communications routinely and efficiently with a wider range of devices associated with a wider range of data traffic profiles and types than current systems are optimised to support. For example it is expected future wireless communications networks will be expected to support efficiently communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems [1], as well as future iterations/releases of existing systems, to efficiently support connectivity for a wide range of devices associated with different applications and different characteristic data traffic profiles.

Systems incorporating NR technology are expected to support different services (or types of services), which may be characterised by different requirements for latency, data rate and/or reliability. For example, Enhanced Mobile Broadband (eMBB) and Ultra Reliable & Low Latency Communications (URLLC) services are for a reliability of $1\text{-}10^{-5}$ (99.999%) or higher for one transmission of a 32 byte packet with a user plane latency of 1 ms [3]. In addition, systems may be expected to support further enhancements related to Industrial Internet of Things (IIoT) in order to support services with new requirements of high availability, high reliability, low latency, and in some cases, high-accuracy positioning.

Some services may require the transmission of small amounts of data. The transmission of small amounts of data efficiently can represent a technical challenge.

SUMMARY

The present disclosure can help address or mitigate at least some of the issues discussed above.

Example embodiments of the present technique can provide a method of transmitting data by a communications device in a wireless communications network, the method comprising determining an amount of uplink data to be transmitted by the communications device to the wireless communications network, selecting a random access preamble from one of a plurality of groups of random access preambles, selecting modulation and coding for transmitting the uplink data, and transmitting a random access message on a wireless access interface to the wireless communications network as part of a random access procedure. The random access message includes the selected random access preamble which has been selected from one of the groups of the random access preambles. The group of the random access preambles from which the random access preamble is selected is determined according to at least one of an estimate of a transmission path loss for the communications device and the determined amount of the uplink data for transmission, and the modulation and coding for transmitting the uplink data is selected from one or more modulation and coding set levels allocated for the determined group of random access preambles.

Embodiments can provide flexible payload sizes, for example, for small data transmissions when a communications device is in an inactive (RRC_INACTIVE) or idle (RRC_IDLE) state.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and.

DETAILED DESCRIPTION OF THE EMBODIMENTS

Long Term Evolution Advanced Radio Access Technology (4G)

Figure 1:
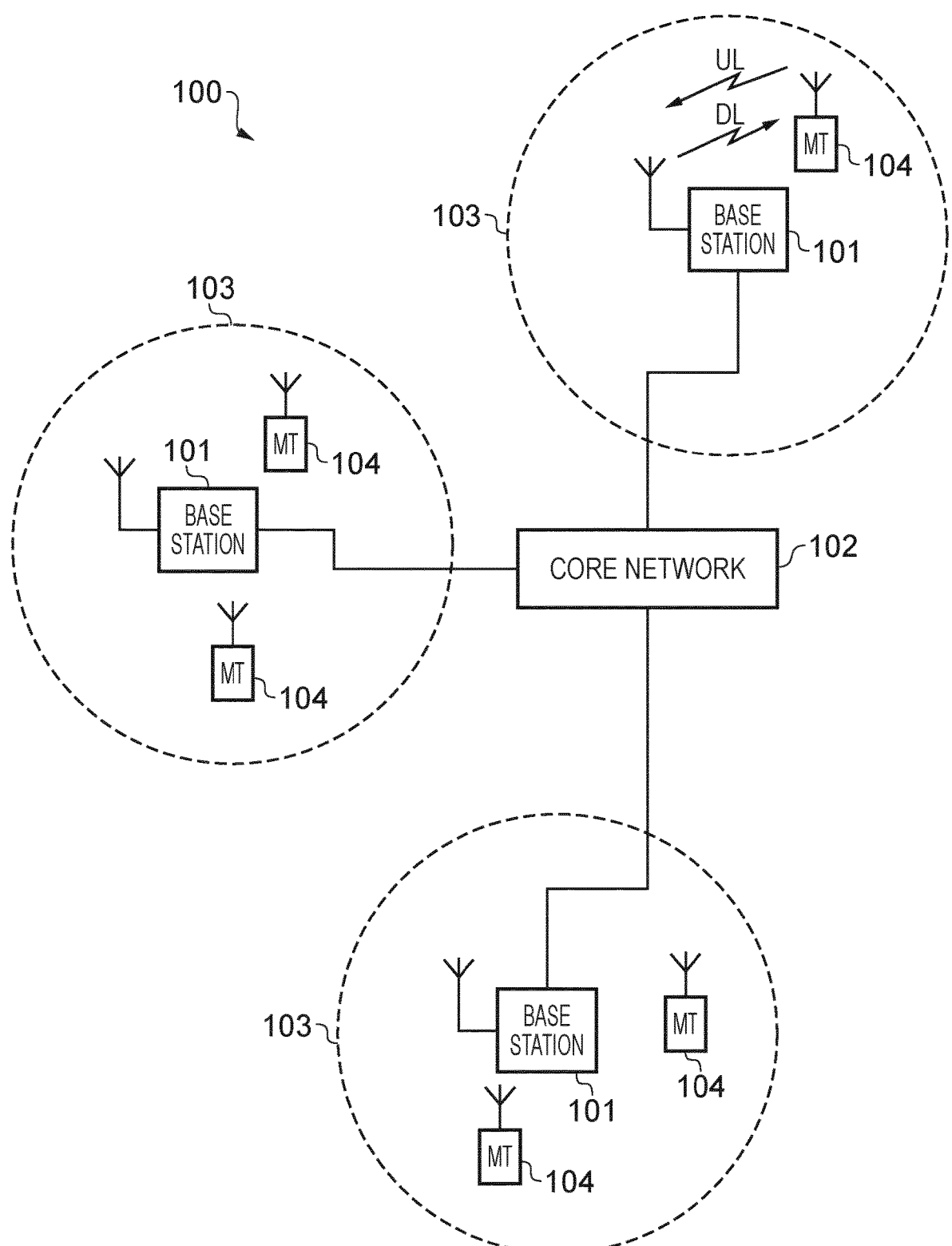
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network part 102. Each base station provides a coverage area 103 (e.g. a cell) within which data can be communicated to and from communications devices 104. Data is transmitted from the base stations 101 to the communications devices 104 within their respective coverage areas 103 via a radio downlink Data is transmitted from the communications devices 104 to the base stations 101 via a radio uplink. The core network part 102 routes data to and from the communications devices 104 via the respective base stations 101 and provides functions such as authentication, mobility management, charging and so on. Communications devices may also be referred to as mobile stations, user equipment (UE), user terminals, mobile radios, terminal devices, and so forth. Base stations, which are an example of network infrastructure equipment/network access nodes, may also be referred to as transceiver stations/nodeBs/e-nodeBs, g-nodeBs (gNB) and so forth. In this regard different terminology is often associated with different generations of wireless telecommunications systems for elements providing broadly comparable functionality. However, example embodiments of the disclosure may be equally implemented in different generations of wireless telecommunications systems such as 5G or new radio as explained below, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
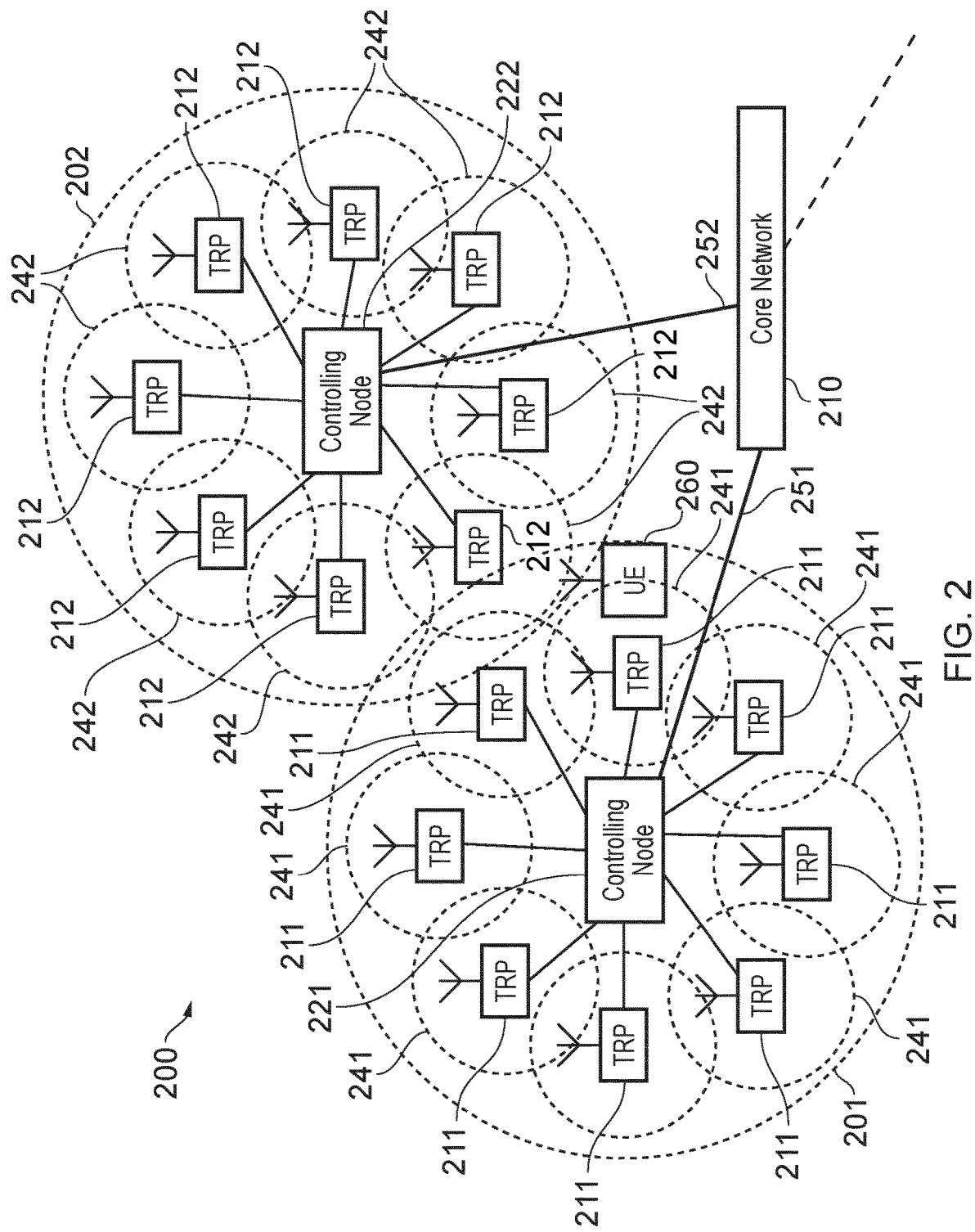
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless communications network/system 200 based on previously proposed approaches which may also be adapted to provide functionality in accordance with embodiments of the disclosure described herein. The new RAT network 200 represented in FIG. 2 comprises a first communication cell 201 and a second communication cell 202. Each communication cell 201, 202, comprises a controlling node (centralised unit) 221, 222 in communication with a core network component 210 over a respective wired or wireless link 251, 252. The respective controlling nodes 221, 222 are also each in communication with a plurality of distributed units (radio access nodes/remote transmission and reception points (TRPs)) 211, 212 in their respective cells. Again, these communications may be over respective wired or wireless links. The distributed units 211, 212 are responsible for providing the radio access interface for communications devices connected to the network. Each distributed unit 211, 212 has a coverage area (radio access footprint) 241, 242 where the sum of the coverage areas of the distributed units under the control of a controlling node together define the coverage of the respective communication cells 201, 202. Each distributed unit 211, 212 includes transceiver circuitry for transmission and reception of wireless signals and processor circuitry configured to control the respective distributed units 211, 212.

In terms of broad top-level functionality, the core network component 210 of the new RAT communications network represented in FIG. 2 may be broadly considered to correspond with the core network 102 represented in FIG. 1, and the respective controlling nodes 221, 222 and their associated distributed units/TRPs 211, 212 may be broadly considered to provide functionality corresponding to the base stations 101 of FIG. 1. The term network infrastructure equipment/access node may be used to encompass these elements and more conventional base station type elements of wireless communications systems. Depending on the application at hand the responsibility for scheduling transmissions which are scheduled on the radio interface between the respective distributed units and the communications devices may lie with the controlling node/centralised unit and/or the distributed units/TRPs.

A communications device or UE 260 is represented in FIG. 2 within the coverage area of the first communication cell 201. This communications device 260 may thus exchange signalling with the first controlling node 221 in the first communication cell via one of the distributed units 211 associated with the first communication cell 201. In some cases communications for a given communications device are routed through only one of the distributed units, but it will be appreciated that in some other implementations communications associated with a given communications device may be routed through more than one distributed unit, for example in a soft handover scenario and other scenarios.

In the example of FIG. 2, two communication cells 201, 202 and one communications device 260 are shown for simplicity, but it will of course be appreciated that in practice the system may comprise a larger number of communication cells (each supported by a respective controlling node and plurality of distributed units) serving a larger number of communications devices.

It will further be appreciated that FIG. 2 represents merely one example of a proposed architecture for a new RAT communications system in which approaches in accordance with the principles described herein may be adopted, and the functionality disclosed herein may also be applied in respect of wireless communications systems having different architectures.

Thus example embodiments of the disclosure as discussed herein may be implemented in wireless telecommunication systems/networks according to various different architectures, such as the example architectures shown in FIGS. 1 and 2. It will thus be appreciated that the specific wireless communications architecture in any given implementation is not of primary significance to the principles described herein. In this regard, example embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment/access node may comprise a control unit/controlling node 221, 222 and/or a TRP 211, 212 of the kind shown in FIG. 2 which is adapted to provide functionality in accordance with the principles described herein.

As mentioned above, embodiments can provide an arrangement for transmitting small amounts of data using a RACH procedure, which may be a two step RACH procedure or a four step RACH procedure.

Figure 3:
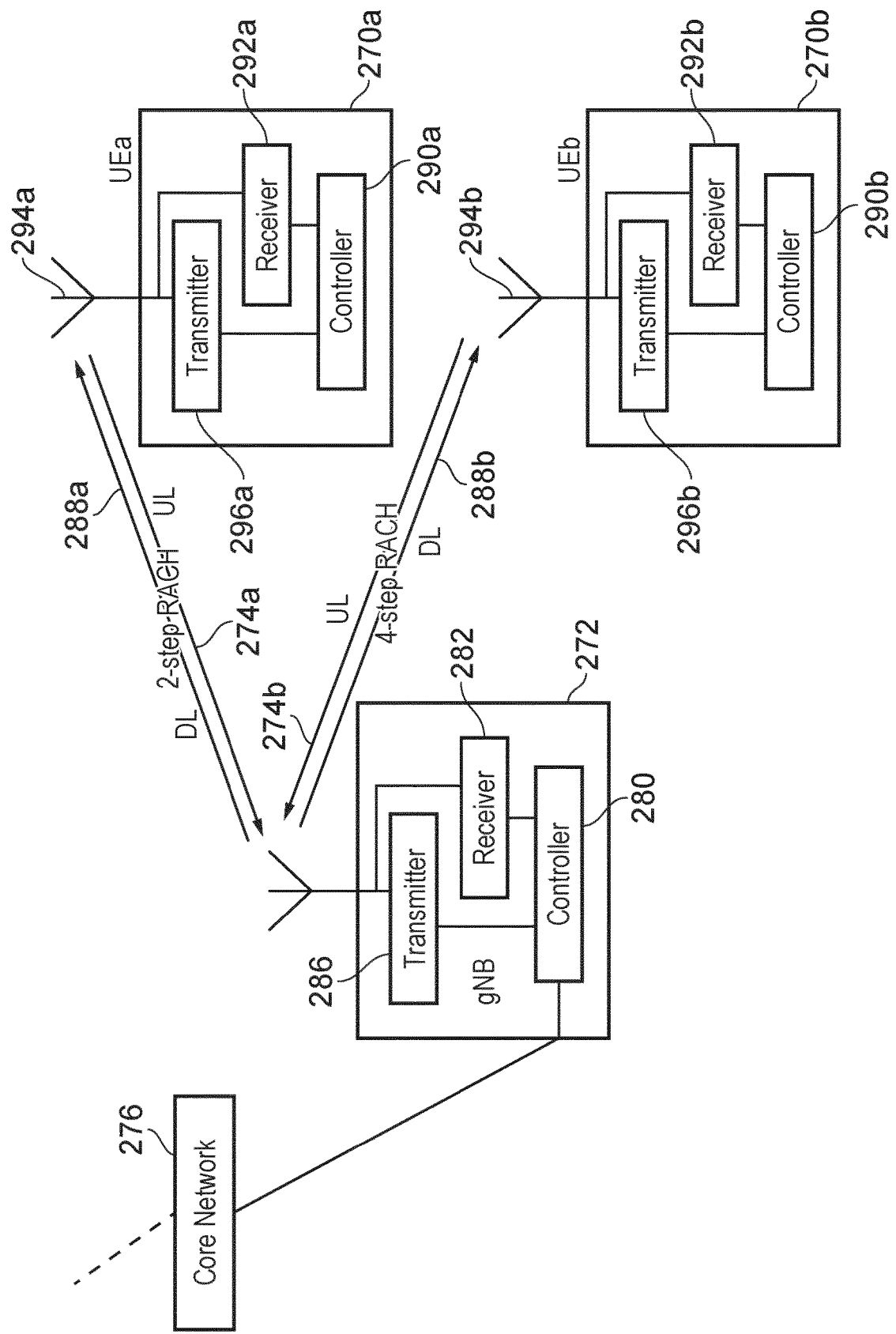
FIG. 3 is a schematic block diagram of an example infrastructure equipment and two communications device one of which is performing a conventional four-step RACH procedure and the other is performing a two step RACH procedure which may be configured in accordance with example embodiments.

A more detailed illustration of two UEs/communications devices 270a, 270b is provided in FIG. 3. As will be explained below, FIG. 3 provides an illustration of two example UEs, which may correspond to a communications device such as the communications device 260 of FIG. 2. As shown in FIG. 3, a first UE, UEa 270a performs a two step RACH procedure and a second UE, UEb 270b performs a four step RACH procedure. It will be appreciated however that two step and four-step RACH may be performed by either a conventional/legacy UE or a NR/5G UE. For example a UE may fall-back to a four-step RACH if a two step RACH fails. Both UEa 270a and UEb 270b transmit signals on an uplink UL and receive signals on a downlink DL from an example network infrastructure equipment 272, which may be thought of as a gNB 101 or a combination of a controlling node 221 and TRP 211. The UEa 270a and UEb 270b are shown to transmit uplink data to the infrastructure equipment 272 via uplink resources UL of a wireless access interface as illustrated generally by arrows 274a, 274b to the infrastructure equipment 272. The UEa 270a and the UEb 270b may similarly be configured to receive downlink data transmitted by the infrastructure equipment 272 via downlink resources DL as indicated by arrows 288a, 288b from the infrastructure equipment 272 to the UEa 270a and the UEb 270b. As with FIGS. 1 and 2, the infrastructure equipment 272 is connected to a core network 276 via an interface 278 to a controller 280 of the infrastructure equipment 272. The infrastructure equipment 272 includes a receiver 282 connected to an antenna 284 and a transmitter 286 connected to the antenna 284. Correspondingly, both of the UEa 270a and the UEb 270b include a controller 290a, 290b connected to a receiver 292a, 292b which receives signals from an antenna 294a, 294b and a transmitter 296a, 296b also connected to the antenna 294a, 294b.

The controller 280 is configured to control the infrastructure equipment 272 and may comprise processor circuitry which may in turn comprise various sub-units/sub-circuits for providing functionality as explained further herein. These sub-units may be implemented as discrete hardware elements or as appropriately configured functions of the processor circuitry. Thus the controller 280 may comprise circuitry which is suitably configured/programmed to provide the desired functionality using conventional programming/configuration techniques for equipment in wireless telecommunications systems. The transmitter 286 and the receiver 282 may comprise signal processing and radio frequency filters, amplifiers and circuitry in accordance with conventional arrangements. The transmitter 286, the receiver 282 and the controller 280 are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the infrastructure equipment 272 will in general comprise various other elements associated with its operating functionality.

Correspondingly, the controller 290a, 290b of the UEa 270a and the UEb 270b is configured to control the transmitter 296a, 296b and the receiver 292a, 292b and may comprise processor circuitry which may in turn comprise various sub-units/sub-circuits for providing functionality as explained further herein. These sub-units may be implemented as discrete hardware elements or as appropriately configured functions of the processor circuitry. Thus the controller 290 may comprise circuitry which is suitably configured/programmed to provide the desired functionality using conventional programming/configuration techniques for equipment in wireless telecommunications systems. Likewise, the transmitter 296 and the receiver 292 may comprise signal processing and radio frequency filters, amplifiers and circuitry in accordance with conventional arrangements. The transmitters 296*a*, 296*b*, receivers 292*a*, 292*b* and controllers 290*a*, 290*b* are schematically shown in FIG. 3 as separate elements for ease of representation. However, it will be appreciated that the functionality of these elements can be provided in various different ways, for example using one or more suitably programmed programmable computer(s), or one or more suitably configured application-specific integrated circuit(s)/circuitry/chip(s)/chipset(s). As will be appreciated the communications devices 270*a*, 270*b* will in general comprise various other elements associated with its operating functionality, for example a power source, user interface, and so forth, but these are not shown in FIG. 3 in the interests of simplicity.

The controllers 280, 290*a*, 290*b* may be configured to carry out instructions which are stored on a computer readable medium, such as a non-volatile memory. The processing steps described herein may be carried out by, for example, a microprocessor in conjunction with a random access memory, operating according to instructions stored on a computer readable medium.

Four-Step RACH Procedure

In wireless telecommunications networks, such as LTE type networks, there are different Radio Resource Control (RRC) modes for terminal devices. For example, it is common to support an RRC idle mode (RRC_IDLE) and an RRC connected mode (RRC_CONNECTED). A terminal device in the idle mode may transition to connected mode, for example because it needs to transmit uplink data or respond to a paging request, by undertaking a random access procedure. The random access procedure involves the terminal device transmitting a preamble on a physical random access channel and so the procedure is commonly referred to as a RACH or PRACH procedure/process.

In addition to a terminal device deciding itself to initiate a random access procedure to connect to the network, it is also possible for the network, e.g. a base station, to instruct a terminal device in connected mode to initiate a random access procedure by transmitting to the terminal device an instruction to do so. Such an instruction is sometimes referred to as a PDCCH order (Physical Downlink Control Channel order), see, for example, Section 5.3.3.1.3 in ETSI TS 136 213 V13.0.0 (2016-01)/3GPP TS 36.212 version 13.0.0 Release 13 [7]. There are various scenarios in which a network triggered RACH procedure (PDCCH order) may arise.

Figure 4:
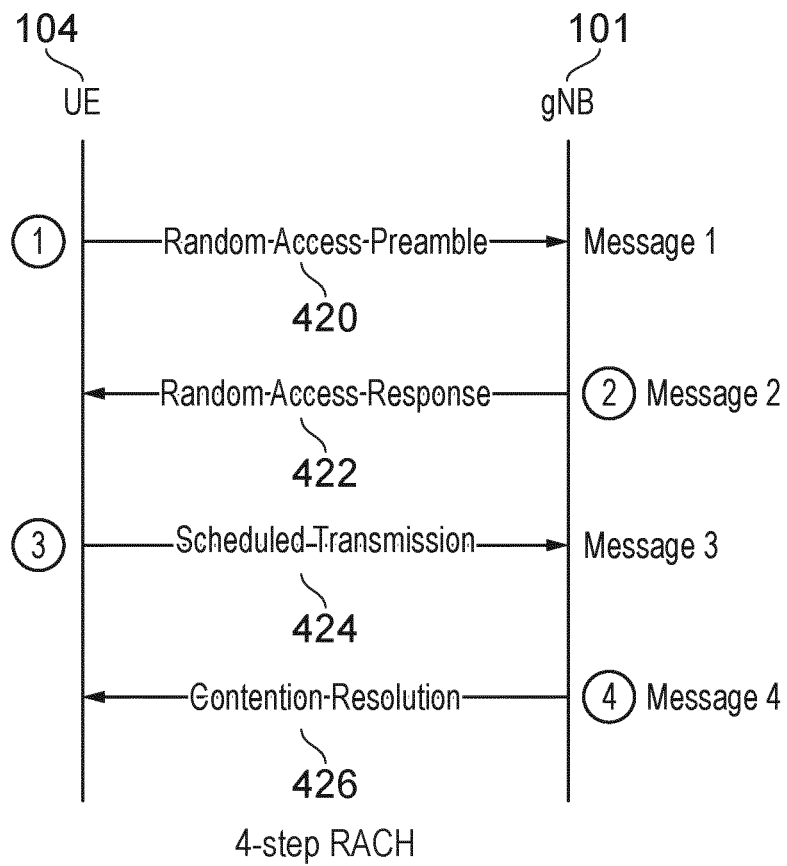
FIG. 4 is a message flow diagram showing a typical four-step RACH procedure used in LTE systems.

FIG. 4 shows a typical RACH procedure used in LTE systems such as that described by reference to FIG. 1 which could also be applied to an NR wireless communications system such as that described by reference to FIG. 2. A communications device (or UE) 270*b*, which could be in an inactive or idle mode, may have some data which it needs to send to the network. To do so, the UE sends a random access preamble 420 (message 1) to a gNodeB 272. This random access preamble 420 indicates the identity of the communications device 104 to the gNodeB 101, such that the gNodeB 101 can address the communications device 104 during later stages of the RACH procedure. Assuming the random access preamble 420 is successfully received by the gNodeB 101, the gNodeB 101 will transmit a random access response 422 message (message 2) to the communications device 104 based on the identity indicated in the received random access preamble 420. The random access response 422 message carries a further identity which is assigned by the gNodeB 101 to identify the communications device 104, as well as a timing advance value such that the communications device 104 can change its timing to compensate for the round trip delay caused by its distance from the gNodeB 101 and grant uplink resources for the communications device 104 to transmit the data in.

Following the reception of the random access response message 422, the communications device 104 transmits the scheduled transmission of data 424 to the gNodeB 101 (message 3), using the identity assigned to it in the random access response message 422. Assuming there are no collisions with other UEs, which may occur if another UE and the communications device 104 send the same random access preamble 420 to the gNodeB 101 at the same time and using the same frequency resources, the scheduled transmission of data 424 is successfully received by the gNodeB 101. The gNodeB 101 will respond to the scheduled transmission 424 with a contention resolution message 426 (message 4).

In 5G/NR systems, an "inactive" RRC state may be used, where a UE is able to start data transfer with a low delay in the inactive state without transition to a connected state. Various possible solutions have been proposed to permit this, one of which is a two step RACH procedure.

Two-Step RACH Procedure

A development to transmit data more quickly for particular applications is known as a two step RACH [4]. As will be appreciated, compared with the four-step RACH process, the two step RACH process can provide a facility for transmitting data more quickly. Accordingly it has been proposed to develop general MAC procedures covering both physical layer and higher layer aspects for the two step RACH process. In general, the benefit of the two step RACH procedure compared with the four-step PRACH procedure is to reduce the time it takes for connection setup/resume procedure. For example in an ideal situation the two step RACH will reduce the latency by halving the number of steps from four to two for initial access UEs. In addition, it is considered that a two step RACH procedure has potential benefits for channel access in NR unlicensed spectrum (NR-U) (see e.g. [5]).

Broadly, the two step RACH allows the combination of the transmission of the random access preamble 420 with the transmission of data 424 of FIG. 4 as an initial transmission ("Message A" or "MsgA"), and similarly the combination of the transmission of the random access response 422 and contention resolution message 426 as a response ("Message B", or "MsgB").

A fallback procedure may be provided to allow a RACH procedure which is started according to the specifications for a two step RACH to instead proceed according to the four-step RACH procedure. Two-step RACH may be applicable for communications devices in the RRC_INACTIVE, RRC_CONNECTED and RRC_IDLE states.

Figure 5:
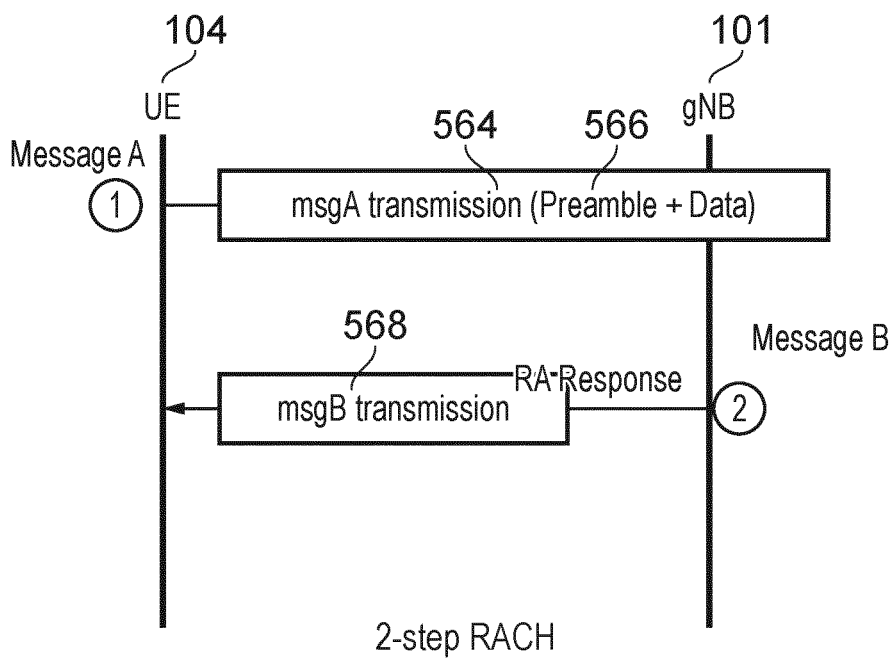
FIG. 5 is a message flow diagram showing a typical two step RACH procedure.

A message flow diagram illustrating the two step RACH process is shown in FIG. 5. As its name suggests, in the two step RACH process, there are only two steps as follows:

1. The UE 201 transmits a Message A 562 which comprises a RACH preamble 564 and data. The data 566 is transmitted on a shared uplink channel, such as a physical uplink shared channel, PUSCH 566 that in a four-step RACH procedure would be transmitted in Message 3. More specifically the choice of a particular preamble may pre-configure the communications device 104 to transmit the data in pre-configured resources of the uplink shared channel as explained below.

2. The base station 101 having successfully received the Message A 562 responds with a Message B 568 which incorporates both a RAR (message 2) of the four-step RACH procedure and the corresponding data (PDSCH) that in a four-step RACH procedure would be transmitted in Message 4.

Downlink Control Information

Downlink messages (i.e. messages transmitted by the base station 102), such as the Message B (MsgB) or the Message 2, may be preceded by a transmission of downlink control information (DCI) as a resource allocation message to indicate downlink communications resources on which the downlink message is to be transmitted.

A communications device which has recently transmitted either a Message A or a random access request may therefore monitor a downlink control channel on which the DCI may be transmitted. The communications device may determine that the DCI allocates resources for a message transmitted as part of the RACH procedure based on a temporary identity used to encode the DCI. For example, the DCI may be encoded using a random access radio network temporary identity (RA-RNTI), specifically pre-allocated for the purpose of encoding a DCI which allocates resources for a random access response (RAR) message.

Transmitting Uplink Data with Preamble

In contrast for the transmission of uplink data, a communications device may transmit a RACH preamble in a PRACH channel and then transmit uplink information (control of data) in resources of a shared uplink channel (PUSCH) which is associated with the PRACH channel. The transmission of small amounts of uplink data in the following description can for example therefore comprises transmission of a preamble and then transmission of uplink data in associated resources of an uplink shared channel.

Small Data Transmission

As mentioned above, a concept previously proposed in 3GPP for 5G/NR is that of small data transmission. Some examples of small data transmission and infrequent data traffic can include:

Smartphone applications:
  Traffic from Instant Messaging services (whatsapp™, QQ, wechat™ etc)
  Heart-beat/keep-alive traffic from IM/email clients and other apps
  Push notifications from various applications
Non-smartphone applications:
  Traffic from wearables (periodic positioning information etc)
  sensors (Industrial Wireless Sensor Networks transmitting temperature, pressure readings periodically or in an event triggered manner etc)
  smart meters and smart meter networks sending periodic meter readings As part of a standardisation process, 3GPP has already completed a basic version of 5G in Rel-15 known as New Radio (NR). In addition, further enhancements have been proposed for Rel-16, incorporating new features such as two step RACH [6], Industrial Internet of Things (IIoT) [7] and NR-based Access to Unlicensed Spectrum [8].

In accordance with 3GPP current work item [9], example embodiments described below can enable small data transmission in an RRC_INACTIVE state as follows:

Enabling user plane data transmission for small data packets from the RRC_INACTIVE state in or as part of a Message A (two step RACH) or Message 3 (four step RACH).

Enabling flexible payload sizes larger than the Rel-16 Common Control Channel (CCCH) message size that is possible currently for the RRC_INACTIVE state for Message A and Message 3 to support user plane data transmission in uplink (actual payload size can be up to network configuration).

Example embodiments of the present technique can provide a method of transmitting data by a communications device in a wireless communications network, the method comprising determining an amount of uplink data to be transmitted by the communications device to the wireless communications network, selecting a random access preamble from one of a plurality of groups of random access preambles, selecting modulation and coding for transmitting the uplink data, and transmitting a random access message on a wireless access interface to the wireless communications network as part of a random access procedure. The random access message includes the selected random access preamble which has been selected from one of the groups of the random access preambles. The group of the random access preambles from which the random access preamble is selected is determined according to at least one of an estimate of a transmission path loss for the communications device and the determined amount of the uplink data for transmission, and the modulation and coding for transmitting the uplink data is selected from one or more modulation and coding levels or parameters allocated for the determined group of random access preambles. According to example embodiments therefore each of the groups of random access preambles has associated with it a payload size, a path loss and or more MCS levels. According to example embodiments, each of the groups of random access preambles has associated with it a PRB set. Transmission path loss is a known expression representing a loss of signal strength with distance. It can be estimated by a communications device by known techniques.

Figure 6:
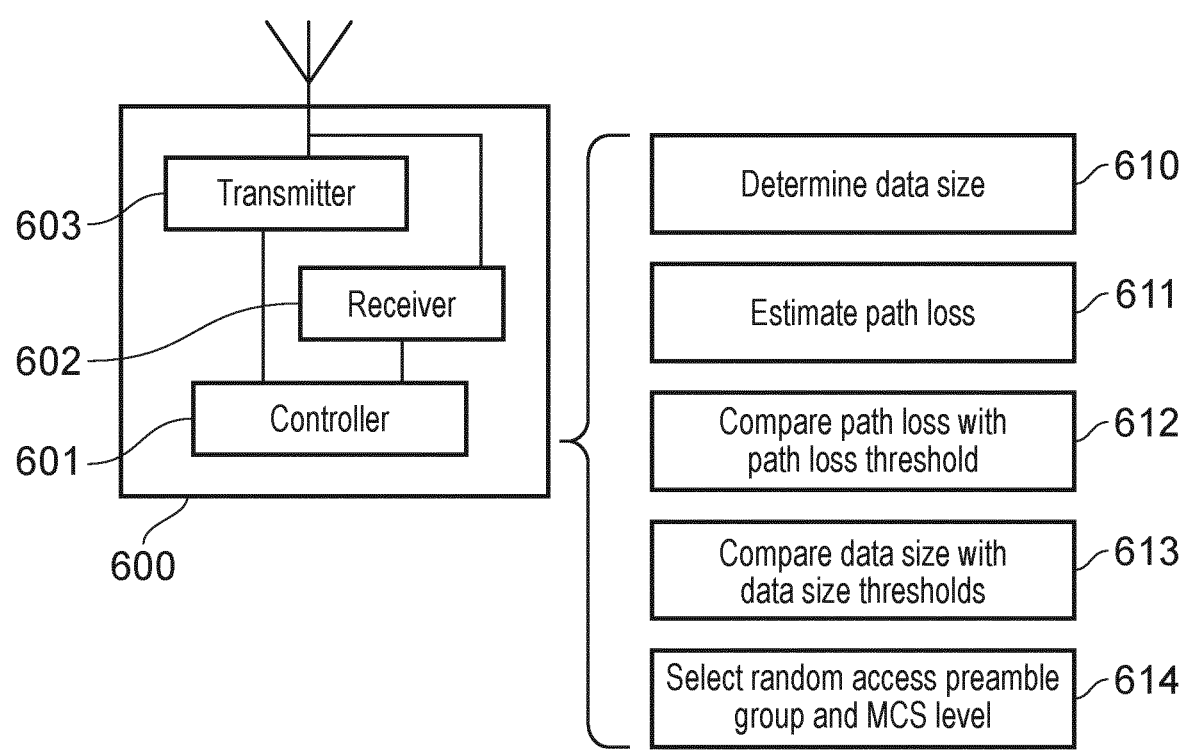
FIG. 6 is a schematic block diagram of an example of a communications device illustrating example operations according to an example embodiment.

FIG. 6 is a schematic diagram illustrating instructions executed by the controller 601 of a communications device 600, which may correspond to a communications device such as the communications device 260 in FIG. 2, in accordance with at least some of the embodiments described herein. The controller 601 determines an amount of uplink data to be transmitted 610, estimates a path loss 611 of signals transmitted between the communications device 600 and a gNB, compares the path loss with a path loss threshold 612 and, on the basis of at least one of the path loss and the amount of uplink data to be transmitted, compares the determined amount of the uplink data with one or more data size thresholds 613, selects at least a random access preamble group and an MCS level 614. In some examples, the communications device 600 may also select a PRB set in step 614.

In some examples the uplink data is transmitted in or as part of a MessageA of a two-step random access procedure. In other examples the uplink data is transmitted in or as part of a Message 3 of a four step random access procedure. Embodiments therefore include application with the two step or the four step random access procedure which may be configured by the wireless communications network. In one embodiment, the network may provide signalling information to the communications device 600 indicating whether the uplink data is to be transmitted as part of a Message A of a two step random access procedure or whether the uplink data is to be transmitted as part of a Message 3 in a four step random access procedure. Further embodiments discussed herein are appropriate for a two step random access procedure although it will be appreciated that a four step random access procedure could be used.

Figure 7:
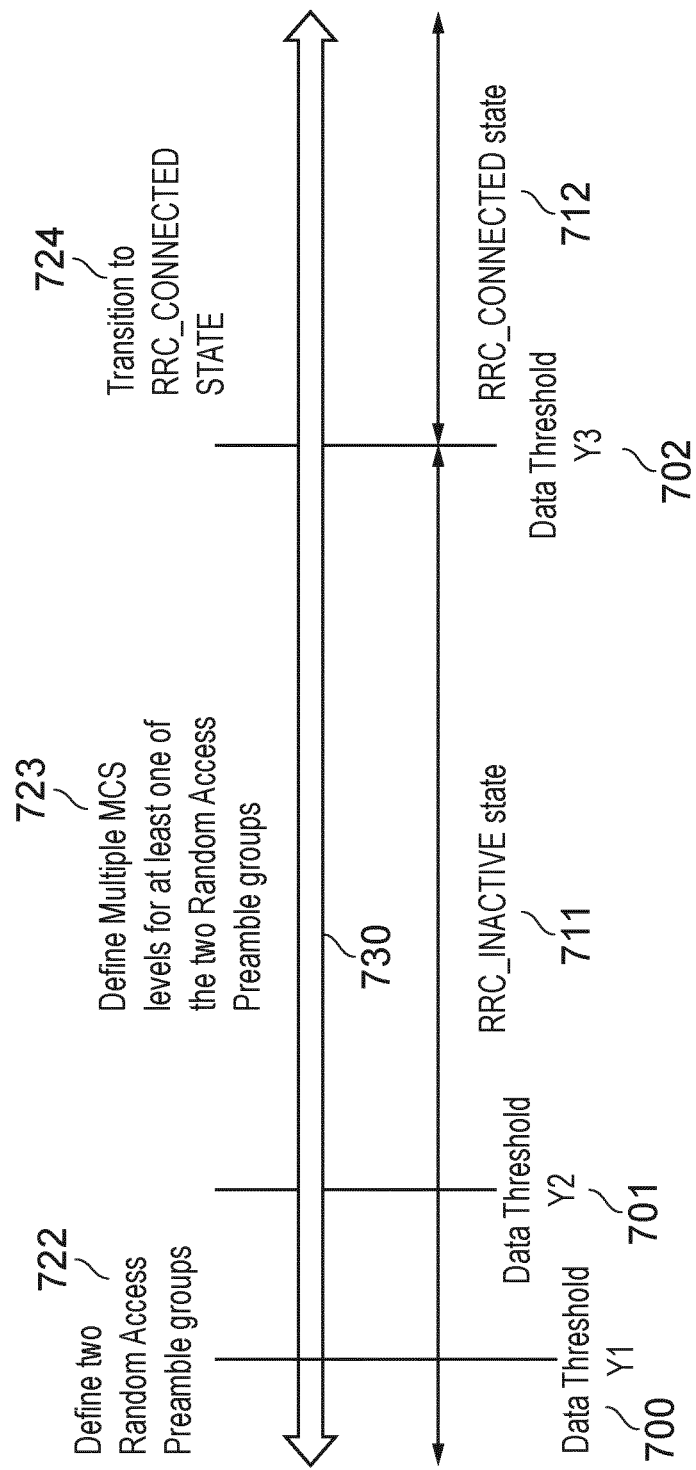
FIG. 7 is a graphical representation illustrating operations which may be carried out by a communications device depending on a determined amount of uplink data to be transmitted according to an example embodiment.

In some examples, the communications device 600 may compare a determined amount of uplink data to one or more data thresholds which may be set by a network, such as the network 210 in FIG. 2. The one or more data thresholds may be predetermined. FIG. 7 is a schematic diagram illustrating the comparison of a determined amount of uplink data 730 with one or more data thresholds according to one embodiment. The communications device 600 may compare the determined amount of the uplink data 730 with a data threshold Y3 702 defined by the network. If the determined amount of uplink data to be transmitted 730 is larger than the data threshold Y3 702 defined by the network then the communications device 600 may transition to an RRC_CONNECTED state 724. If the determined amount of uplink data to be transmitted 730 is less than the data threshold Y3 702 defined by the network then the communications device 600 may transition to an RRC_INACTIVE state 711 or may transmit uplink data whilst in the RRC_INACTIVE state 711.

The communications device 600 may compare the determined amount of the uplink data 730 with a data threshold Y2 701. If the determined amount of uplink data 730 is less than the data threshold Y2 701, then the network may have partitioned the random access preambles into two random access preamble groups 722 for the communications device 600 in a cell, such as communications cell 201 in FIG. 2, associated with a gNB, such as controlling node 221 in FIG. 2, to which the communications device 600 is attempting to transmit uplink data. Each random access preamble group may correspond to a different payload size.

In some examples, a transmission of uplink data by the communications device 600 which is below the data threshold Y2 701 is associated with a 3GPP Release-16 two step RACH procedure and a transmission of uplink data by the communications device which is above the data threshold Y2 701 but below the data threshold Y3 702 is associated with a 3GPP Release-17 two step RACH procedure. Thus, according to the Release-17 two-step RACH procedure multiple MCS levels are provided for one or more groups of preambles and/or multiple PRB sets may be associated with the same preamble group. Alternatively more than two preamble groups are defined in Release-17. As will be appreciated, this is just one example and in other embodiments, the threshold Y2 may not be used in order to reduce the number of thresholds. Furthermore Y2 may not be configured by system information, but may be predefined.

If the network partitions the random access preambles into two groups 722 where each group corresponds to a different payload size as explained above, the two random access preamble groups may be random access preamble group A and random access preamble group B.

In this embodiment, the communication device 600 may select one of the random access preamble groups for use in an uplink data transmission procedure when the communications device 600 is in the RRC_INACTIVE state 711. The random access preamble group A or B may have been signalled to the communications device 600 in a System Information Block (SIB). As will be explained below, a path loss threshold and a data threshold Y1 may be used by the communications device 600 to select either preamble group A or B. The data threshold Y1 may be given by, for example:

ra-Msg3SizeGroupA ENUMERATED {b56, b144, b208, b256, b282, b480, b640, b800, b1000, b72, spare6, spare5, spare4, spare3, spare2, spare1}.

In this embodiment, a Modulation and Coding Scheme (MCS) level and a Physical Resource Block (PRB) sets are associated respectively with each random access preamble group. The MCS levels refer to different combinations of modulation and coding parameters which may increase redundancy to improve a likelihood of data being communicated but which may reduce capacity to transmit data. The MCS level and PRB set may be signalled in the SIB for each of random access preamble Groups A and B. The payload size for each of random access preamble Groups A and B may be derived from the MCS and the number of PRBs which are signalled in the SIB for each preamble group. For example, for random access preamble group A, the SIB may signal MCS level 1 with PRB set 1 and, for random access preamble group B, the SIB may signal MCS level 2 with PRB set 2. In this embodiment, MCS level 2 may have a higher modulation and/or coding rate than MCS level 1.

Figure 8:
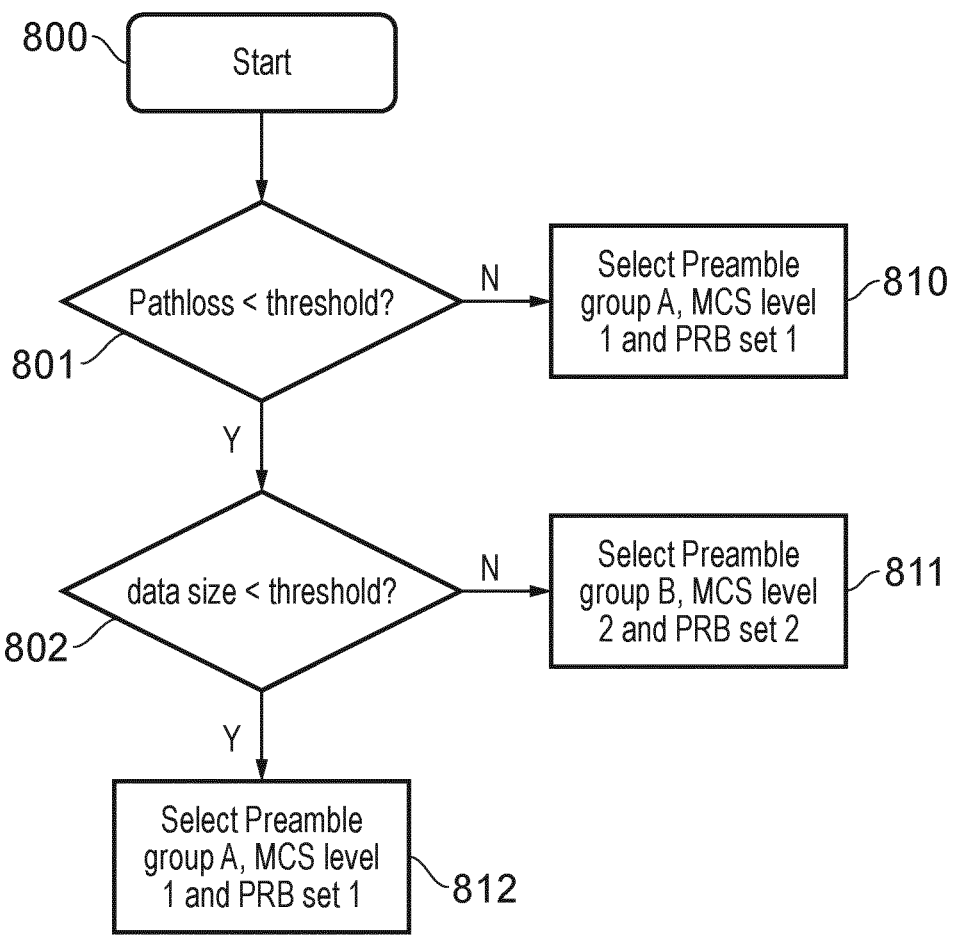
FIG. 8 is a flow diagram illustrating operations performed by a communications device according to an example embodiment.

FIG. 8 is a flow diagram showing a sequence of instructions which may be executed by the controller 601 of the communications device 600 when the network configures two random access preamble groups A and B. The instructions may be based on instructions 612, 613 and 614 of FIG. 6. As shown in FIG. 8, from a start 800, the communications device 600 proceeds to a first decision point 801 and compares a path loss of the uplink data to be transmitted with a path loss threshold. If the path loss of the uplink data to be transmitted is less than the path loss threshold then processing proceeds to decision step 802. Otherwise processing proceeds to step 810 and preamble group A, MCS level 1 and PRB set 1 are selected. As will be understood from Table 1 below, if the path loss is greater than the path loss threshold, then the communications device 600 is at the cell edge and therefore will have only one data size configured. If the processing proceeds to a second decision point 802, the communications device 600 compares the amount of the uplink data to be transmitted to a data threshold Y1 700. If the amount of the uplink data to be transmitted is less than the data threshold Y1 700 then processing proceeds to step 812 and preamble group A, MCS level 1 and PRB set 1 are selected. Otherwise processing proceeds to step 811 and preamble group B, MCS level 2 and PRB set 2 are selected 811.

According to this example, the communications device 600 is configured to select between the random access preamble groups A and B based on the conditions outlined in Table 1 below. The communications device 600 compares 801 the path loss of the uplink data to be transmitted from the communications device to the gNB with a path loss threshold. The communications device 600 compares 802 the determined amount of uplink data to be transmitted with a data threshold Y1 700.

Table 1 shows the conditions for selecting a random access preamble group by the communications device 600 based on the path loss threshold and the data threshold Y1 700. If the path loss of the determined amount of uplink data to be transmitted is greater than or equal to the path loss threshold and the data size of the determined amount of uplink data to be transmitted is less than or equal to the data threshold Y1 700 then the communications device 600 may select random access preamble group A, MCS level 1 and PRB set 1 810. If the path loss of the determined amount of uplink data to be transmitted is less than the path loss threshold and the data size of the determined amount of uplink data to be transmitted is less than or equal to the data threshold Y1 700 then the communications device 600 may select random access preamble group A, MCS level 1 and PRB set 1 812. If the path loss of the uplink data to be transmitted is less than the path loss threshold and the determined amount of uplink data to be transmitted is greater than the data threshold Y1 700 then the communications device 600 may select random access preamble group B, MCS level 2 and PRB set 2 811.

TABLE 1

| Pathloss threshold X1 | Data threshold Y1 | MCS level | Preamble group | Resources |
|---|---|---|---|---|
| Pathloss < X1 | Data size > Y1 | MCS 2 | Group B | PRB set 2 |
|  | Data size <= Y1 | MCS 1 | Group A | PRB set 1 |
| Pathloss > = X1 | Data size <= Y1 | MCS 1 | Group A | PRB set 1 |

In the above description the uplink data for transmission may be determined from an amount of data present in an input buffer of the communications device transmitter at a predetermined time, which may be based on a radio frame of the wireless access interface.

Figure 9:
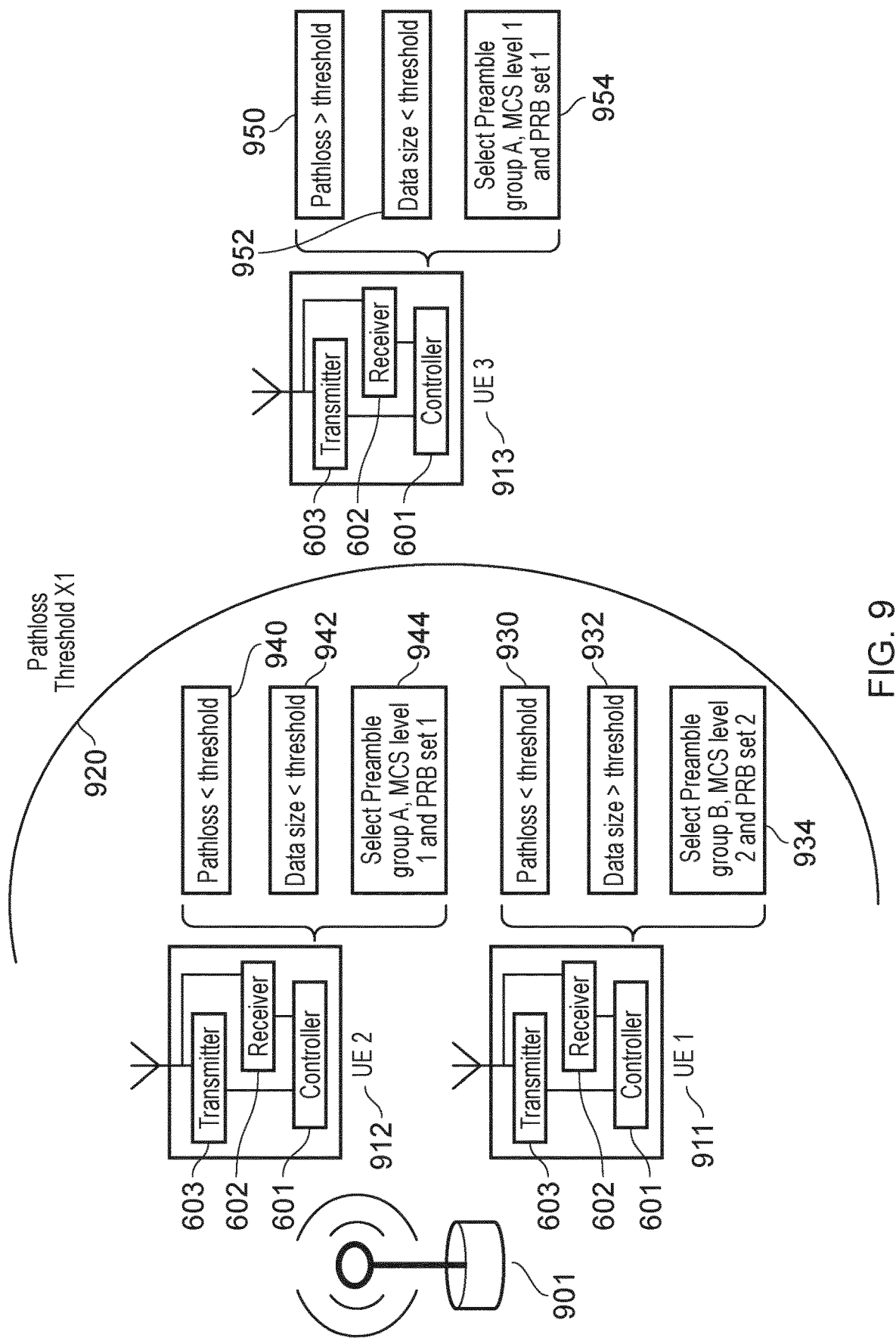
FIG. 9 is a part schematic block diagram part flow diagram showing an example of a selection of different preamble groups by communications devices operating according to example embodiments.

As an illustrative example based on this embodiment, FIG. 9 shows a gNB 901 forming a cell in which a UE 1 911, UE 2 912 and/or UE 3 913 are attached and can communicate uplink data via a wireless access interface. In particular, UE 1 911, UE 912 and/or UE 3 913 may attempt to transmit uplink data to the gNB 901 in Message A of a two step RACH procedure. Each of UE 1 911, UE 2 912 and UE 3 913 determines an amount of the uplink data to be transmitted 610, estimates a transmission path loss 611 of signals transmitted between the communications device and a gNB 901, compares 612 the transmission path loss with a path loss threshold 920, compares 613 the determined amount of the uplink data with a data threshold Y1 700, and, on the basis of at least one of the transmission path loss and the amount of uplink data to be transmitted, selects 614 a random access preamble group and an MCS level. For example, UE1 911 determines 930 that a path loss of the uplink data to be transmitted is below a path loss threshold 920 and determines 932 that the amount of the uplink data to be transmitted is above a data threshold Y1 700, and therefore selects 934 preamble group B, MCS level 2 and PRB set 2. UE2 912 determines 940 that the path loss of the uplink data to be transmitted is below a path loss threshold 920 and determines 942 that the amount of the uplink data to be transmitted is below a data threshold Y1 700, and therefore selects 944 preamble group A, MCS level 1 and PRB set 1. UE3 913 determines 950 that the path loss of the uplink data to be transmitted is above a path loss threshold 920 and determines 952 that the amount of the uplink data to be transmitted is below a data threshold Y1 700, and therefore selects 954 preamble group A, MCS level 1 and PRB set 1.

Defining Multiple MCS Levels

In an alternative embodiment, if the communications device 600 determines that the amount of uplink data to be transmitted is larger than the data threshold Y2 701 and below the data threshold Y3 702, then the network may configure two random access preamble groups for the communications device 600 in the cell associated with the gNB, and define multiple MCS levels 723 for one or more of the random access preamble groups as will be explained below. In this embodiment, the uplink data to be transmitted using random access preamble group B may encounter less path loss than the uplink data to be transmitted using random access preamble group A. In this embodiment, additional MCS levels may therefore be defined for random access preamble group B. For example, the SIB for random access preamble group B may signal one of MCS levels 2, 3 or 4 and PRB set 2. In this embodiment, the SIB for random access preamble group A may signal MCS level 1 and PRB set 1. In this embodiment, there are three payload sizes associated with random access preamble B corresponding to MCS levels 2, 3 and 4.

Figure 10:
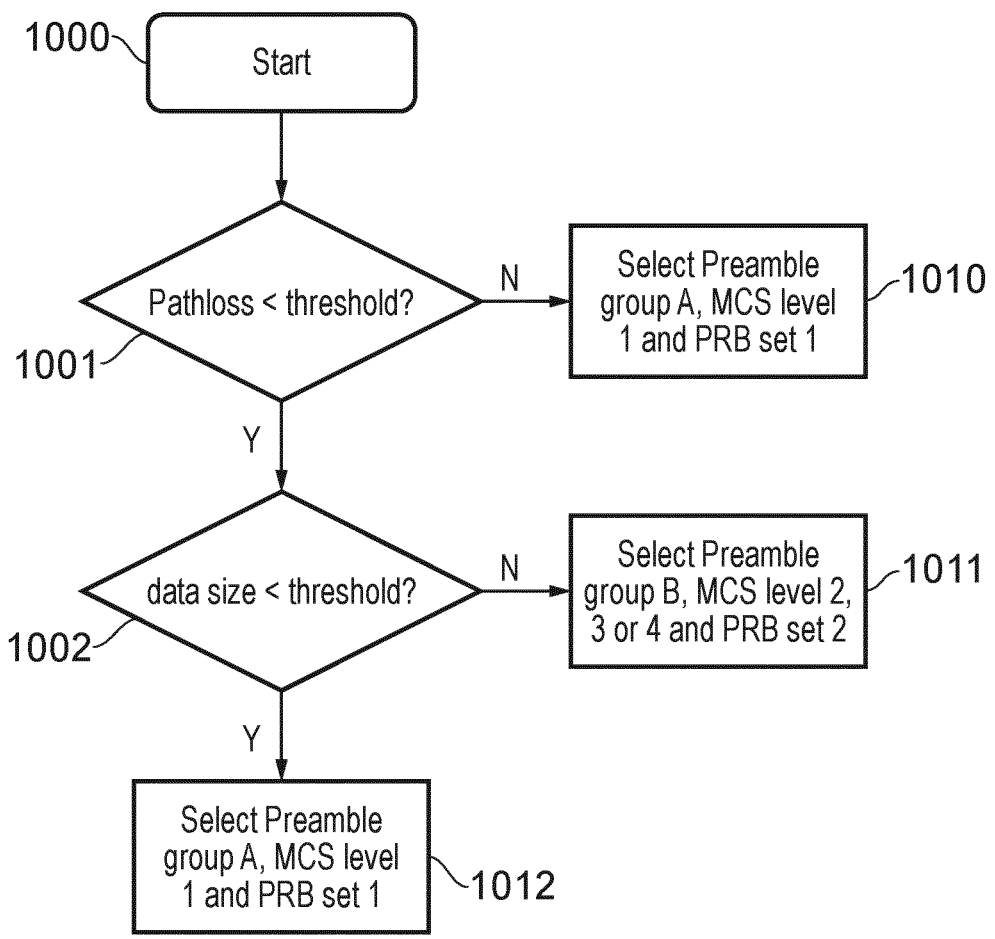
FIG. 10 is a flow diagram showing operations performed by a communications device according to an example embodiment.

FIG. 10 is a flow diagram showing a sequence of instructions which may be executed by the controller 601 of the communications device 600 when the network configures two random access preamble groups A and B and defines more than one MCS level for at least one random access preamble group. The instructions may be based on instructions 612, 613 and 614 of FIG. 6. As shown in FIG. 10, from a start 1000, the communications device 600 proceeds to a first decision point 1001 and compares a path loss of the uplink data to be transmitted with a path loss threshold. If the path loss of the uplink data to be transmitted is less than the path loss threshold then processing proceeds to decision step 1002. Otherwise processing proceeds to step 1010 and preamble group A, MCS level 1 and PRB set 1 are selected. As will be understood from Table 2 below, if the path loss is greater than the path loss threshold, then the communications device 600 is at the cell edge and therefore will have only one data size configured. If the processing proceeds to decision point 2, the communications device 600 may compare 1002 the amount of the uplink data to be transmitted to a data threshold Y1 700. If the amount of the uplink data to be transmitted is less than the data threshold Y1 700 then processing proceeds to step 1012 and preamble group A, MCS level 1 and PRB set 1 are selected. Otherwise processing proceeds to step 1011 and preamble group B, one of MCS levels 2, 3 or 4 and PRB set 2 are selected 1011.

According to this example, the communications device 600 is configured to select between the random access preamble groups A and B based on the conditions outlined in Table 2 below. The communications device 600 compares 1001 the path loss of the uplink data to be transmitted from the communications device to the gNB with a path loss threshold. The communications device 600 compares 1002 the determined amount of uplink data to be transmitted with a data threshold Y1 700.

Table 2 shows the conditions for selecting a random access preamble by the communications device 600 based on the path loss threshold and the data threshold Y1 700. If the path loss of the determined amount of uplink data to be transmitted is greater than or equal to the path loss threshold and the data size of the determined amount of uplink data to be transmitted is less than or equal to the data threshold Y1 700 then the communications device 600 may select random access preamble group A, MCS level 1 and PRB set 1 1010. If the path loss of the determined amount of uplink data to be transmitted is less than the path loss threshold and the data size of the determined amount of uplink data to be transmitted is less than or equal to the data threshold Y1 700 then the communications device 600 may select random access preamble group A, MCS level 1 and PRB set 1 1012. If the path loss of the uplink data to be transmitted is less than the path loss threshold and the determined amount of uplink data to be transmitted is greater than the data threshold Y1 700 then the communications device 600 may select random access preamble group B, one of MCS levels 2, 3 or 4 and PRB set 2 1011. In this example embodiment, the communications device 600 selects one of MCS levels 2, 3 or 4 according to at least one of the determined amount of uplink data to be transmitted and the condition of the radio channel used to transmit the uplink data.

TABLE 2

| Pathloss threshold X1 | Data threshold Y1 | MCS level | Preamble group | Resources |
|---|---|---|---|---|
| Pathloss < X1 | Data size > Y1 | MCS 2, 3, 4 | Group B | PRB set 2 |
|  | Data size <= Y1 | MCS 1 | Group A | PRB set 1 |
| Pathloss >= X1 | Data size <= Y1 | MCS 1 | Group A | PRB set 1 |

Figure 11:
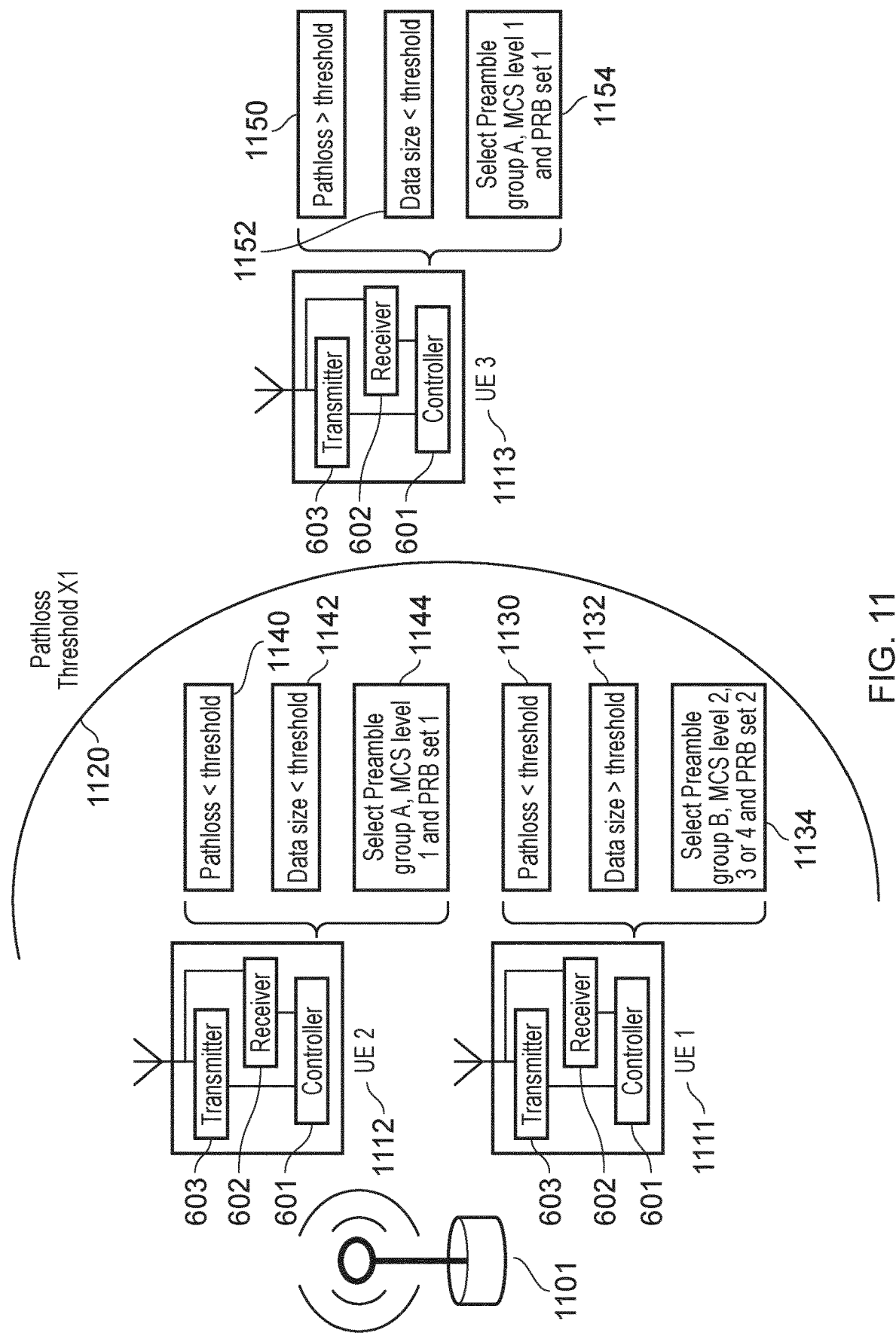
FIG. 11 is a part schematic block diagram part flow diagram illustrating an example of a selection of different preamble groups by communications devices operating according to an example embodiment.

As an illustrative example based on this embodiment, FIG. 11 shows a gNB 1101 forming a cell in which a UE 1 1111, UE 2 1112 and/or UE 3 1113 are attached and can communicate uplink data via a wireless access interface. In particular, UE 1 1111, UE 1112 and/or UE 3 1113 may attempt to transmit uplink data to the gNB 1101 in Message A of a two step RACH procedure. Each of UE 1 1111, UE 2 1112 and UE 3 113 determines an amount of the uplink data to be transmitted 610, estimates 611 a transmission path loss of signals transmitted between the communications device and a gNB 1101, compares 612 the transmission path loss with a path loss threshold 1120, compares 613 the determined amount of the uplink data with a data threshold Y1 700, and, on the basis of at least one of a transmission path loss and the amount of uplink data to be transmitted, selects a random access preamble group and an MCS level 614. For example, UE1 1111 determines 1130 that a path loss of the uplink data to be transmitted is below a path loss threshold 1120 and determines 1132 that the amount of the uplink data to be transmitted is above a data threshold Y1 700, and therefore selects 1134 preamble group B, one of MCS levels 2, 3 or 4 and PRB set 2. UE2 1112 determines 1140 that the path loss of the uplink data to be transmitted is below a path loss threshold 1120 and determines 1142 that the amount of the uplink data to be transmitted is below a data threshold Y1 700, and therefore selects 1144 preamble group A, MCS level 1 and PRB set 1. UE3 1113 determines 1150 that the path loss of the uplink data to be transmitted is above a path loss threshold 1120 and determines 1152 that the amount of the uplink data to be transmitted is below a data threshold Y1 700, and therefore selects 1154 preamble group A, MCS level 1 and PRB set 1.

In this embodiment, the gNB may attempt to determine the payload associated with the selected random access preamble by blindly decoding the uplink data transmitted to the gNB by the communications device by, for example, first attempting to decode the data using MCS level 2. If this fails, the gNB may attempt to decode the uplink data using MCS3. If this fails, the gNB may attempt to decode the uplink data using MCS4. It will be appreciated that the order in which the eNB attempts to use MCS levels to blindly decode the small data transmitted can be changed.

Defining More than Two Random Access Preamble Groups

Figure 12:
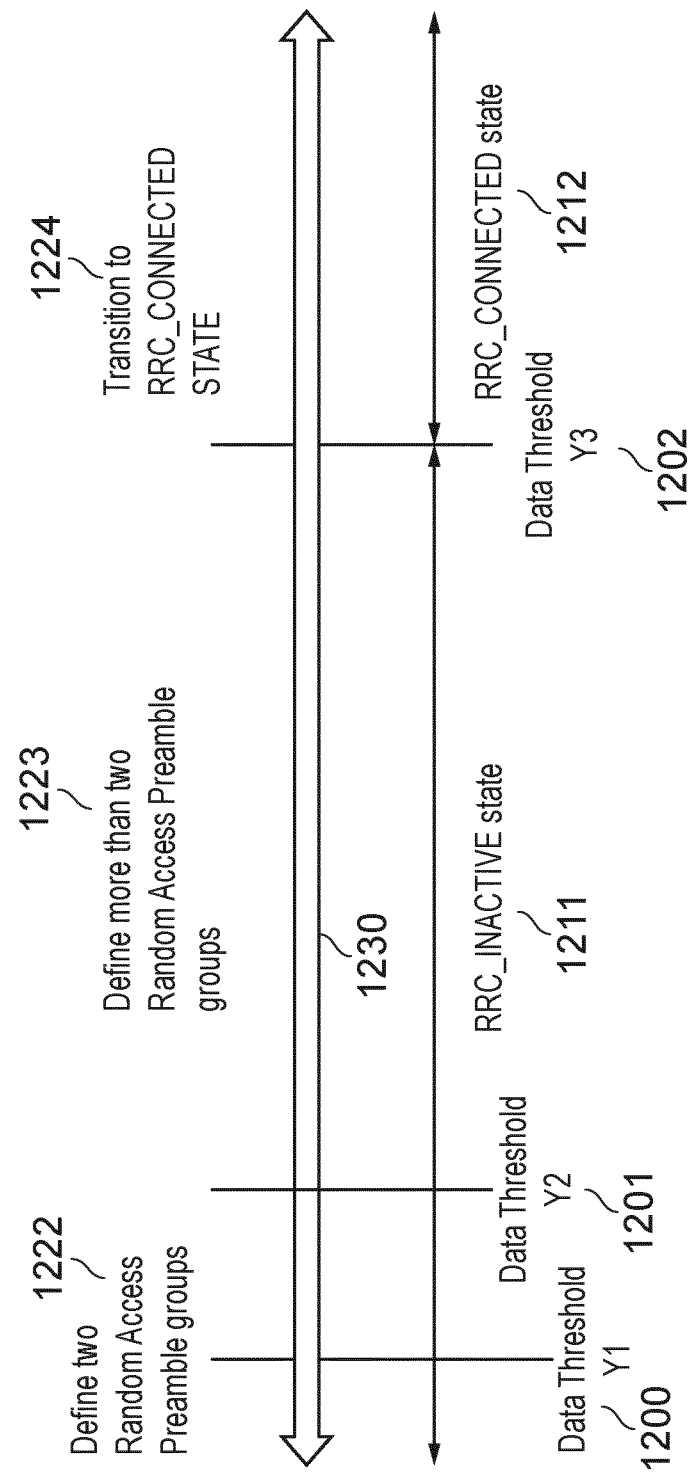
FIG. 12 is a graphical representation illustrating operations which may be carried out by a communications device depending on a determined amount of uplink data to be transmitted according to an example embodiment.

In an alternative embodiment, as shown in FIG. 12, if the communications device 600 determines that an amount of uplink data to be transmitted 1230 is above a data threshold Y2 1201 and below a data threshold Y3 1202 then the network may configure more than two random access preamble groups 1223 for the communications device 600 in the cell associated with the gNB. FIG. 12 is broadly based on FIG. 7, with the exception that in a case where the amount of the uplink data 1230 to be transmitted is between the data threshold Y2 1201 and data threshold Y3 1202, it may be possible to perform further preamble grouping 1223. In this embodiment, for example when the path loss of the uplink data is small, further preamble grouping is possible and a different PRB set for each group can be supported. For example, if the path loss of the uplink data to be transmitted is less than the path loss threshold and the determined amount of uplink data to be transmitted 1230 is greater than the data threshold Y1 1200, then the communications device 600 may select random access preamble group B, C or D. The preamble groups may be communicated by the network in SIB. For random access preamble group B, MCS level 2 and PRB set 2 may be defined, for random access preamble group C, MCS level 3 and PRB set 3 may be defined. For random access preamble group D, MCS level 4 and PRB set 4 may be defined. The random access preamble groups A, B, C and D may each correspond to a different payload size.

Figure 13:
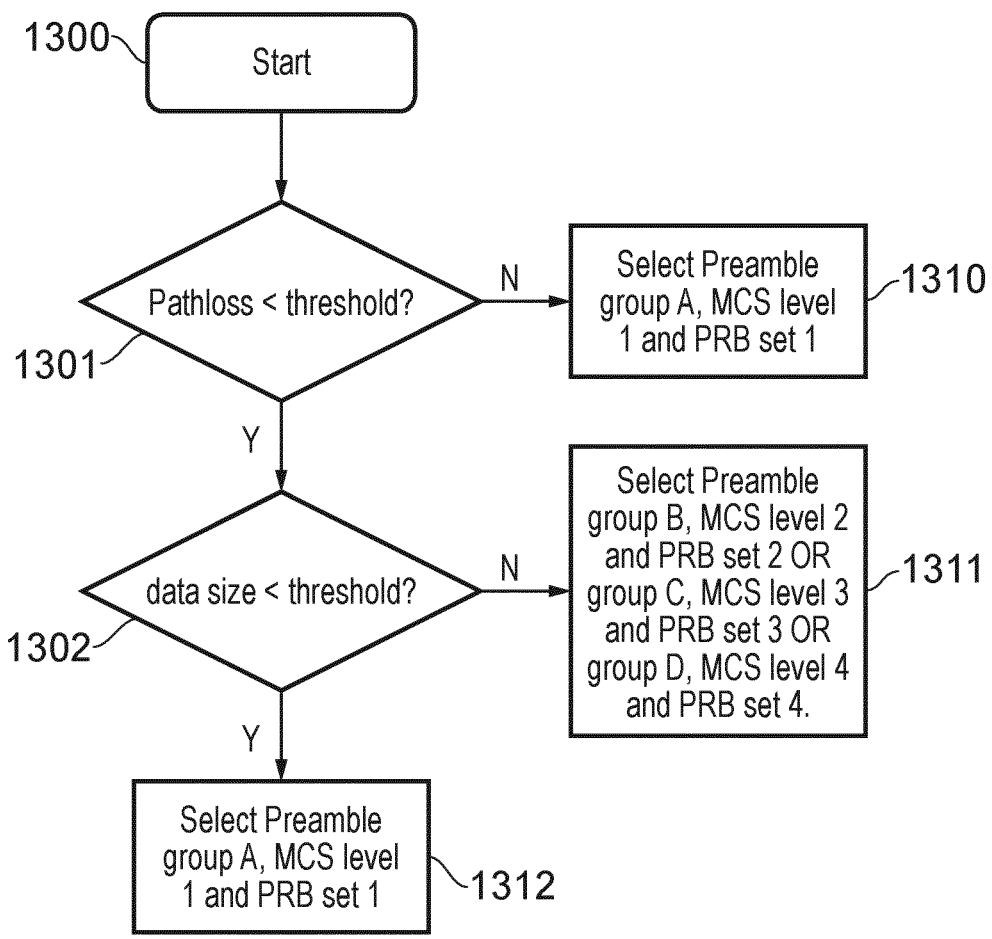
FIG. 13 is a flow diagram illustrating an operation of a communications device according to an example embodiment of the present technique.
Figure 14:
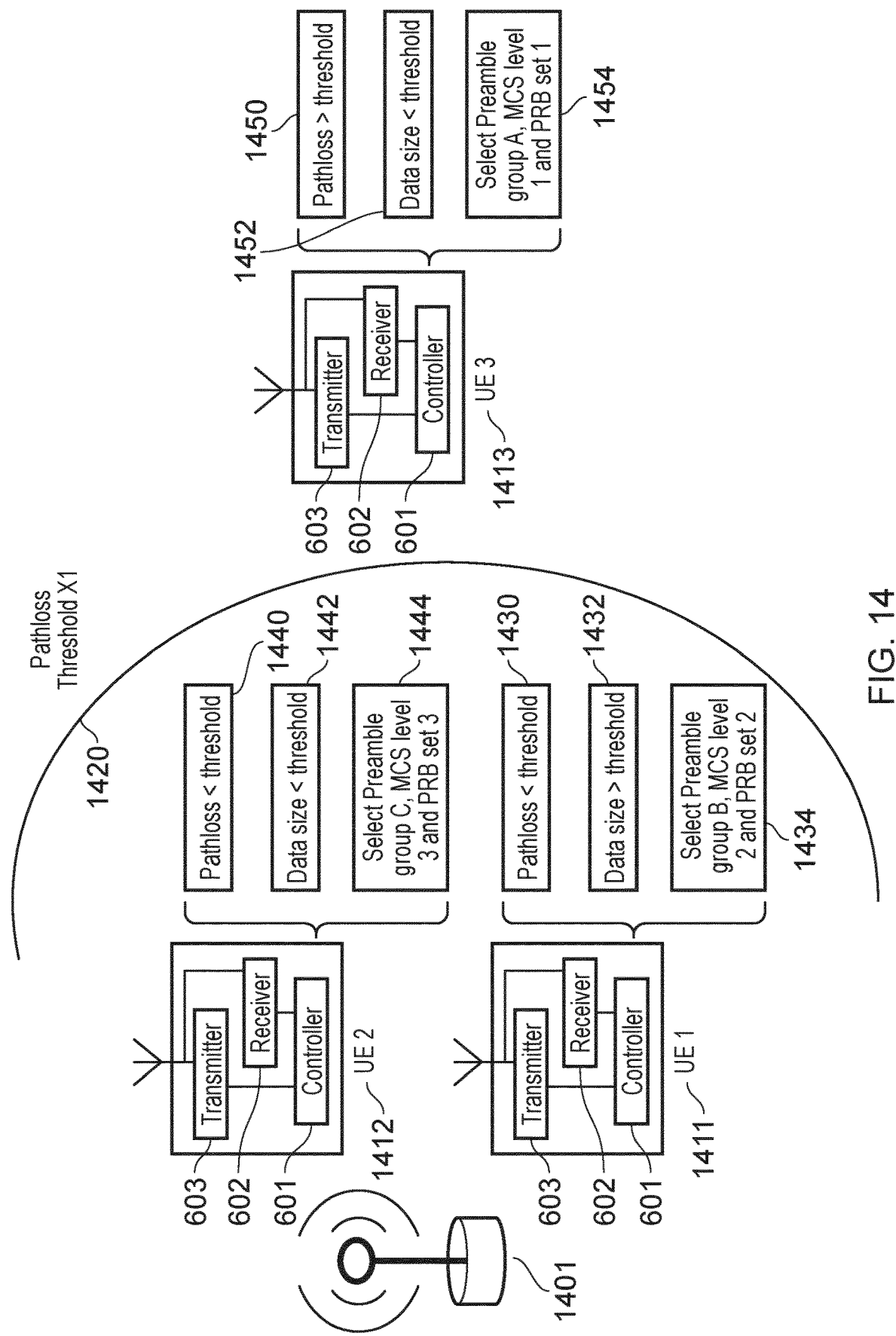
FIG. 14 is a part schematic block diagram part flow diagram illustrating an example of a selection of different preamble groups by communications devices operating according to example embodiments.

FIG. 13 is a flow diagram showing a sequence of instructions which may be executed by the controller 601 of the communications device 600 when the network configures more than two random access preamble groups. The instructions may be based on instructions 612, 613 and 614 of FIG. 6. As shown in FIG. 13, from a start 1300, the communications device 600 proceeds to a first decision point 1301 and compares a path loss of the uplink data to be transmitted with a path loss threshold. If the path loss of the uplink data to be transmitted is less than the threshold then processing proceeds to decision step 1302. Otherwise processing proceeds to step 1310 and preamble group A, MCS level 1 and PRB set 1 are selected. As will be understood from Table 3 below, if the path loss is greater than the path loss threshold, then the communications device 600 is at the cell edge and therefore will have only one data size configured. If the processing proceeds to decision point 2, the communications device 600 may compare 1302 the amount of the uplink data to be transmitted to a data threshold Y1 1200. If the amount of the uplink data to be transmitted is less than the data threshold Y1 1200 then processing proceeds to step 1312 and preamble group A, MCS level 1 and PRB set 1 are selected. Otherwise processing proceeds to step 1311 selects either preamble group B, MCS level 2 and PRB set 2 or preamble group C, MCS level 3 and PRB set 3 or preamble group D, MCS level 4 and PRB 4.

Table 3 shows the conditions for selecting a random access preamble by the communications device 600 based on the path loss threshold and the data threshold Y1 1200. If the path loss of the determined amount of uplink data to be transmitted is greater than or equal to the path loss threshold and the data size of the determined amount of uplink data to be transmitted is less than or equal to the data threshold Y1 1200 then the communications device 600 may select random access preamble group A, MCS level 1 and PRB set 1 1310. If the path loss of the determined amount of uplink data to be transmitted is less than the path loss threshold and the data size of the determined amount of uplink data to be transmitted is less than or equal to the data threshold Y1 1200 then the communications device 600 may select random access preamble group A, MCS level 1 and PRB set 1 1312. If the path loss of the uplink data to be transmitted is less than the path loss threshold and the determined amount of uplink data to be transmitted is greater than the data threshold Y1 1200 then the communications device 600 selects 1311 either preamble group B, MCS level 2 and PRB set 2 or preamble group C, MCS 3 and PRB set 3 or preamble group D, MCS level 4 and PRB 4.

TABLE 3

| Pathloss threshold X1 | Data threshold Y1 | MCS level | Preamble group | Resources |
|---|---|---|---|---|
| Pathloss < X1 | Data size > Y1 | MCS 4 | Group D | PRB set 4 |
|  | Data size > Y1 | MCS 3 | Group C | PRB set 3 |
|  | Data size > Y1 | MCS 2 | Group B | PRB set 2 |
|  | Data size <= Y1 | MCS 1 | Group A | PRB set 1 |
| Pathloss > = X1 | Data size <= Y1 | MCS 1 | Group A | PRB set 1 |

As an illustrative example based on this embodiment, FIG. 11 shows a gNB 1401 forming a cell in which a UE 1 1411, UE 2 1412 and/or UE 3 1413 are attached and can communicate uplink data via a wireless access interface. In particular, UE 1 1411, UE 1412 and/or UE 3 1413 may attempt to transmit uplink data to the gNB 1401 in Message A of a two step RACH procedure. Each of UE 1 1411, UE 2 1412 and UE 3 1413 determines an amount of the uplink data to be transmitted 610, estimates 611 a transmission path loss of signals transmitted between the communications device and a gNB 1101, compares 612 the transmission path loss with a path loss threshold 1420, compares 613 the determined amount of the uplink data with a data threshold Y1 1200, and, on the basis of at least one of a transmission path loss and the amount of uplink data to be transmitted, selects a random access preamble group and an MCS level 614. For example, UE1 1411 determines 1430 that a path loss of the uplink data to be transmitted is below a path loss threshold 1420 and determines 1432 that the amount of the uplink data to be transmitted is above a data threshold Y1 1200, and therefore selects 1434 preamble group B, MCS level 2 and PRB set 2. UE2 1412 determines 1440 that the path loss of the uplink data to be transmitted is below a path loss threshold 1420 and determines 1442 that the amount of the uplink data to be transmitted is above a data threshold Y1 1200, and therefore selects 1144 preamble group C, MCS level 3 and PRB set 3. UE3 1413 determines 1450 that the path loss of the uplink data to be transmitted is above a path loss threshold 1420 and determines 1452 that the amount of the uplink data to be transmitted is below a data threshold Y1 1200, and therefore selects 1454 preamble group A, MCS level 1 and PRB set 1. It will be appreciated that either of UE 1 1411 or UE 2 1412 could have been configured to choose preamble group D, MCS level 4 and PRB set 4.

In an alternative embodiment, if it is determined that the determined amount of the uplink data is above a data threshold Y2 701, 1201 and below a data threshold Y3 702, 1202 a procedure may be employed involving an uplink data transmission on pre-configured PUSCH (Physical Uplink Shared Channel) resources. In this embodiment, a number of PRBs and one or more MCS levels may be pre-defined. In this example embodiment, the communications device 600 selects an MCS level according to at least one of the determined amount of uplink data to be transmitted and the condition of the radio channel used to transmit the uplink data.

In any of the above example embodiments, if the communications device 600 detects that the data to be transmitted is larger than the data threshold Y3 defined by the network 702, 1202, the communications device 600 may connect to the network and transmit data in the RRC_CONNECTED state 712, 1212. The communications device 600 may detect that the uplink data to be transmitted is larger than the data threshold Y3 702, 1202 defined by the network. This data threshold Y3 702, 1202 may be predefined. In this embodiment, the communications device 600 may transmit a buffer status report (BSR). In some embodiments, the communications device 600 may provide a BSR with an exaggerated buffer level so that the network allows the communications device 600 to move into the RRC_CONNECTED state to transmit data.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the communications device. It will be appreciated such predetermined/predefined information may in general be established, for example, by definition in an operating standard for the wireless telecommunication system, or in previously exchanged signalling between the base station and communications devices, for example in system information signalling, or in association with radio resource control setup signalling, or in information stored in a SIM application. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

It will be appreciated that the principles described herein are not applicable only to certain types of communications device, but can be applied more generally in respect of any types of communications device, for example the approaches are not limited to URLLC/IIoT devices or other low latency communications devices, but can be applied more generally, for example in respect of any type of communications device operating with a wireless link to the communication network.

It will further be appreciated that the principles described herein are applicable not only to LTE-based or 5G/NR-based wireless telecommunications systems, but are applicable for any type of wireless telecommunications system that supports a dynamic scheduling of shared communications resources.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of transmitting data by a communications device in a wireless communications network, the method comprising determining an amount of uplink data to be transmitted by the communications device to the wireless communications network, and either transitioning to a connected state if the determined amount of the uplink data is greater than a first threshold (Y3) or, if the determined amount of the uplink data is less than the first threshold (Y3), selecting a random access preamble from one of a plurality of groups of random access preambles, selecting modulation and coding for transmitting the uplink data, and transmitting a random access message on a wireless access interface to the wireless communications network as part of a random access procedure, the random access message including the selected random access preamble from one of the plurality of groups of the random access preambles, wherein the group of the random access preambles from which the random access preamble is selected is determined according to at least one of an estimate of a transmission path loss for the communications device and the determined amount of the uplink data for transmission, and the modulation and coding for transmitting the uplink data is selected from one or more modulation and coding scheme levels allocated for the determined group of random access preambles.

Paragraph 2. The method according to paragraph 1, comprising selecting a Physical Resource Block, PRB, set for transmitting the uplink data according to at least one of the group of random access preamble from which the random access preamble for the random access message is selected and the modulating and coding scheme level.

Paragraph 3. The method according to paragraph 2, wherein the PRB set which is selected for transmitting the uplink data is different for at least two of the random access preamble groups.

Paragraph 4. The method according to any of paragraphs 1 to 3, wherein at least two of the modulation and coding scheme levels correspond to a different payload size.

Paragraph 5. The method according to paragraph 4, wherein each of the groups of the random access preambles has a plurality of modulating and coding scheme levels associated with it, and the selecting the modulation and coding scheme level includes selecting one of the plurality of modulation and coding scheme levels associated with the selected one of the group of random access preambles.

Paragraph 6. The method according to paragraph 4 or 5, wherein the modulation and coding scheme level is selected in accordance with at least one of the determined amount of uplink data for transmission and the estimate of the transmission path loss.

Paragraph 7. The method according to any of paragraphs 1 to 6, wherein the determining the amount of the uplink data to be transmitted by the communications device comprises determining an amount of data present in an input buffer, inflating the size of the determined amount of the uplink data to be transmitted in the input buffer to a size larger than the amount of the uplink data in the input buffer in order to exceed the first predetermined threshold so that the communications device transitions to the connected state.

Paragraph 8. The method according to any of paragraphs 1 to 7, wherein the modulation and coding scheme parameters and a number of physical resource blocks in each of the physical resource block sets are received by the communications device in a System Information Block, SIB, for each random access preamble group.

Paragraph 9. The method according to any of paragraphs 1 to 8, wherein the random access message comprises the random access preamble and the uplink data, the random access message forming part of a two-step RACH procedure.

Paragraph 10. The method according to any of paragraphs 1 to 8, wherein the random access message and the uplink data are transmitted separately, the transmission of the random access message and the uplink data forming part of a four step RACH procedure.

Paragraph 11. A method of receiving data from a communications device by an infrastructure equipment forming part of a wireless communications network, the method comprising receiving a random access message on a wireless access interface provided by the infrastructure equipment as part of a random access procedure, by detecting a random access preamble and uplink data forming part of the random access message, the random access preamble having been selected by the communications device from one of a plurality of groups of random access preambles, wherein the group of the random access preambles from which the random access preamble was selected by the communications device according to at least one of an estimate of a transmission path loss for the communications device and a determined amount of the uplink data to be transmitted, and a modulation and coding scheme level with which the uplink data was transmitted is associated with the group of random access preambles from which the random access preamble was selected by the communications device.

Paragraph 12. The method according to paragraph 11, comprising decoding the uplink data according to the modulation and coding scheme level, wherein the modulation and coding scheme level is not known by the infrastructure equipment and the uplink data is blindly decoded by the infrastructure equipment.

Paragraph 13. The method according to paragraph 11, comprising the infrastructure equipment transmitting to the communications device a resource allocation message comprising an indication of downlink communications resources allocated for the transmission of the random access response message combined with a radio network terminal identifier which identifies the infrastructure equipment which transmitted the random access message.

Paragraph 14. The method according to any of paragraphs 11 to 13, comprising the infrastructure equipment signalling to the communications device whether a transmission of the uplink data in Message A of a two-step RACH procedure is supported in a cell associated with the infrastructure equipment.

Paragraph 15. The method according to any of paragraphs 11 to 13, comprising the infrastructure equipment signalling to the communications device whether or not a transmission of the uplink data in Message 3 of a four step RACH procedure is supported in a cell associated with the infrastructure equipment.

Paragraph 16. The method according to any of paragraphs 11 to 15, comprising
transmitting as broadcast information to at least the communications device system information comprising modulation and coding scheme parameters and a number of physical resource blocks in each of the physical resource block sets for each of the plurality of groups of random access preambles.

Paragraph 17. The method according to paragraph 16, wherein the broadcast information includes an indication of the first threshold (Y3), a second threshold (Y2) and a third threshold (Y1).

Paragraph 18. A communications device for transmitting data to a wireless communications network, comprising
transceiver circuitry configured to transmit signals and receive signals to and from a wireless communications network, and
controller circuitry configured in combination with the transceiver circuitry
to determine an amount of uplink data to be transmitted by the communications device to the wireless communications network, and either
to transition to a connected state if the determined amount of the uplink data is greater than a first threshold (Y3) or, if the determined amount of the uplink data is less than the first threshold (Y3),
to select a random access preamble from one of a plurality of groups of random access preambles,
to select modulation and coding for transmitting the uplink data, and
to transmit a random access message on a wireless access interface to the wireless communications network as part of a random access procedure, the random access message including the selected random access preamble from one of the plurality of groups of the random access preambles, wherein the group of the random access preambles from which the random access preamble is selected is determined according to at least one of an estimate of a transmission path loss for the communications device and the determined amount of the uplink data for transmission, and the modulation and coding for transmitting the uplink data is selected from one or more modulation and coding scheme levels allocated for the determined group of random access preambles.

Paragraph 19. The communications device according to paragraph 18, wherein the controller circuitry is configured in combination with the transceiver to select a Physical Resource Block, PRB, set for transmitting the uplink data according to at least one of the group of random access preambles from which the random access preamble for the random access message is selected and the modulating and coding scheme level.

Paragraph 20. The communications device according to paragraph 19, wherein the PRB set which is selected for transmitting the uplink data is different for at least two of the random access preamble groups.

Paragraph 21. The communications device according to any of paragraphs 18 to 20, wherein at least two of the modulation and coding scheme levels correspond to a different payload size.

Paragraph 22. The communications device according to paragraph 21, wherein each of the groups of the random access preambles has a plurality of modulating and coding scheme levels associated with it, and the selecting the modulation and coding scheme level includes selecting one of the plurality of modulation and coding scheme levels associated with the selected one of the group of random access preambles.

Paragraph 23. The communications device according to paragraph 21 or 22, wherein the modulation and coding scheme level is selected in accordance with at least one of the determined amount of uplink data for transmission and the estimate of the transmission path loss.

Paragraph 24. The communications device according to any of paragraphs 18 to 23, wherein the control circuitry is configured to determine an amount of data present in an input buffer, to inflate the size of the determined amount of the uplink data to be transmitted in the input buffer to a size larger than the amount of the uplink data in the input buffer in order to exceed the first predetermined threshold so that the communications device transitions to the connected state.

Paragraph 25. The communications device according to any of paragraphs 18 to 25, wherein the modulation and coding scheme parameters and a number of physical resource blocks in each of the physical resource block sets are received by the communications device in a System Information Block, SIB, for each random access preamble group.

Paragraph 26. The communications device according to any of paragraphs 18 to 25, wherein the random access message comprises the random access preamble and the uplink data, the random access message forming part of a two-step RACH procedure.

Paragraph 27. The communications device according to any of paragraphs 18 to 25, wherein the random access message and the uplink data are transmitted separately, the transmission of the random access message and the uplink data forming part of a four step RACH procedure.

Paragraph 28. An infrastructure equipment forming part of a wireless communications network, the infrastructure equipment comprising
transceiver circuitry configured to transmit signals and receive signals to and from a communications device, and
controller circuitry configured in combination with the transceiver circuitry to receive a random access message on a wireless access interface provided by the infrastructure equipment as part of a random access procedure, by detecting a random access preamble and uplink data forming part of the random access message, the random access preamble having been selected by the communications device from one of a plurality of groups of random access preambles, wherein the group of the random access preambles from which the random access preamble was selected by the communications device according to at least one of an estimate of a transmission path loss for the communications device and a determined amount of the uplink data to be transmitted, and a modulation and coding scheme level with which the uplink data was transmitted is associated with the group of random access preambles from which the random access preamble was selected by the communications device.

Paragraph 29. The infrastructure equipment according to paragraph 28, wherein the controller circuitry is configured in combination with the transceiver circuitry
to decode the uplink data according to the modulation and coding scheme level, wherein the modulation and coding scheme level is not known by the infrastructure equipment and the uplink data is blindly decoded by the infrastructure equipment.

Paragraph 30. The infrastructure equipment according to paragraph 28, wherein the controller circuitry is configured in combination with the transceiver circuitry
to transmit to the communications device a resource allocation message comprising an indication of downlink communications resources allocated for the transmission of the random access response message combined with a radio network terminal identifier which identifies the infrastructure equipment which transmitted the random access message.

Paragraph 31. The infrastructure equipment according to any of paragraphs 28 to 30, wherein the controller circuitry is configured in combination with the transceiver circuitry
to signal to the communications device whether a transmission of the uplink data in Message A of a two-step RACH procedure is supported in a cell associated with the infrastructure equipment.

Paragraph 32. The infrastructure equipment according to any of paragraphs 28 to 30, wherein the controller circuitry is configured in combination with the transceiver circuitry
to signal to the communications device whether or not a transmission of the uplink data in Message 3 of a four step RACH procedure is supported in a cell associated with the infrastructure equipment.

Paragraph 33. The infrastructure equipment according to any of paragraphs 28 to 32, wherein the controller circuitry is configured in combination with the transceiver circuitry
to transmit as broadcast information to at least the communications device system information comprising modulation and coding scheme parameters and a number of physical resource blocks in each of the physical resource block sets for each of the plurality of groups of random access preambles.

Paragraph 34. The infrastructure equipment according to paragraph 33, wherein the broadcast information includes an indication of the first threshold (Y3), a second threshold (Y2) and a third threshold (Y1).

Paragraph 35. Circuitry for transmitting data to a wireless communications network, the circuitry comprising
transceiver circuitry configured to transmit signals and receive signals to and from a wireless communications network, and
controller circuitry configured in combination with the transceiver circuitry
to determine an amount of uplink data to be transmitted by the communications device to the wireless communications network, and either
to transition to a connected state if the determined amount of the uplink data is greater than a first threshold (Y3) or, if the determined amount of the uplink data is less than the first threshold (Y3),
to select a random access preamble from one of a plurality of groups of random access preambles,
to select modulation and coding for transmitting the uplink data, and
to transmit a random access message on a wireless access interface to the wireless communications network as part of a random access procedure, the random access message including the selected random access preamble from one of the plurality of groups of the random access preambles, wherein the group of the random access preambles from which the random access preamble is selected is determined according to at least one of an estimate of a transmission path loss for the communications device and the determined amount of the uplink data for transmission, and the modulation and coding for transmitting the uplink data is selected from one or more modulation and coding scheme levels allocated for the determined group of random access preambles.

Paragraph 36. Circuitry for forming part of a wireless communications network, the circuitry comprising
transceiver circuitry configured to transmit signals and receive signals to and from a communications device, and
controller circuitry configured in combination with the transceiver circuitry to receive a random access message on a wireless access interface provided by the infrastructure equipment as part of a random access procedure, by detecting a random access preamble and uplink data forming part of the random access message, the random access preamble having been selected by the communications device from one of a plurality of groups of random access preambles, wherein the group of the random access preambles from which the random access preamble was selected by the communications device according to at least one of an estimate of a transmission path loss for the communications device and a determined amount of the uplink data to be transmitted, and a modulation and coding scheme level with which the uplink data was transmitted is associated with the group of random access preambles from which the random access preamble was selected by the communications device.

Paragraph 37. Computer program code which when executed performs the method according to any of paragraphs 1 to 17.

REFERENCES

[1] RP-182090, "Revised SID: Study on NR Industrial Internet of Things (IoT)," 3GPP RAN #81.
[2] Holma H. and Toskala A, "LTE for UMTS OFDMA and SC-FDMA based radio access", John Wiley and Sons, 2009.
[3] 3GPP TS 38.321, "Medium Access Control (MAC) protocol specification (Rel-15)", v15.3.0.
[4] 3GPP document RP-182894, "WID: 2-step RACH for NR," RAN #82.
[5] 3GPP document RP-182878, "NR-based Access to Unlicensed Spectrum", RAN #82.

[6] 3GPP document RP-192330, "WID: 2-step RACH for NR".
[7] 3GPP document RP-192324, "WID: NR Industrial Internet of Things (IoT)".
[8] 3GPP document RP-191575, "WID: NR-based Access to Unlicensed Spectrum".
[9] 3GPP document RP-193168, "WID: NR small data transmissions in INACTIVE state".

What is claimed is:

1. A method of transmitting data by a communications device in a wireless communications network, the method comprising:
determining an amount of uplink data to be transmitted by the communications device to the wireless communications network, and either
transitioning to a connected state if the determined amount of the uplink data is greater than a first threshold or, if the determined amount of the uplink data is less than the first threshold,
selecting a random access preamble from one of a plurality of groups of random access preambles,
selecting modulation and coding for transmitting the uplink data, and
transmitting a random access message on a wireless access interface to the wireless communications network as part of a random access procedure, the random access message including the selected random access preamble from one of the plurality of groups of the random access preambles,
wherein the group of the random access preambles from which the random access preamble is selected is determined according to at least one of an estimate of a transmission path loss for the communications device and the determined amount of the uplink data for transmission, and the modulation and coding for transmitting the uplink data is selected from one or more modulation and coding scheme levels allocated for the determined group of random access preambles, and
wherein the determining the amount of the uplink data to be transmitted by the communications device comprises:
determining an amount of data present in an input buffer,
inflating the size of the determined amount of the uplink data to be transmitted in the input buffer to a size larger than the amount of the uplink data in the input buffer in order to exceed the first predetermined threshold so that the communications device transitions to the connected state.

2. The method according to claim 1, comprising selecting a Physical Resource Block (PRB) set for transmitting the uplink data according to at least one of the group of random access preamble from which the random access preamble for the random access message is selected and the modulating and coding scheme level.

3. The method according to claim 2, wherein the PRB set which is selected for transmitting the uplink data is different for at least two of the random access preamble groups.

4. The method according to claim 1, wherein at least two of the modulation and coding scheme levels correspond to a different payload size.

5. The method according to claim 4, wherein each of the groups of the random access preambles has a plurality of modulating and coding scheme levels associated with it, and the selecting the modulation and coding scheme level includes selecting one of the plurality of modulation and coding scheme levels associated with the selected one of the group of random access preambles.

6. The method according to claim 4, wherein the modulation and coding scheme level is selected in accordance with at least one of the determined amount of uplink data for transmission and the estimate of the transmission path loss.

7. The method according to claim 1, wherein the modulation and coding scheme parameters and a number of physical resource blocks in each of the physical resource block sets are received by the communications device in a System Information Block (SIB) for each random access preamble group.

8. The method according to claim 1, wherein the random access message comprises the random access preamble and the uplink data, the random access message forming part of a two-step random access channel (RACH) procedure.

9. The method according to claim 1, wherein the random access message and the uplink data are transmitted separately, the transmission of the random access message and the uplink data forming part of a four-step random access channel (RACH) procedure.

10. A non-transitory computer-readable medium encoded with computer-readable instructions that, when executed by circuitry, cause the circuitry to perform the method according to claim 1.

11. A method of receiving data from a communications device by an infrastructure equipment forming part of a wireless communications network, the method comprising:
receiving a random access message on a wireless access interface provided by the infrastructure equipment as part of a random access procedure, by detecting a random access preamble and uplink data forming part of the random access message, the random access preamble having been selected by the communications device from one of a plurality of groups of random access preambles,
wherein the group of the random access preambles from which the random access preamble was selected by the communications device according to at least one of an estimate of a transmission path loss for the communications device and a determined amount of the uplink data to be transmitted, and a modulation and coding scheme level with which the uplink data was transmitted is associated with the group of random access preambles from which the random access preamble was selected by the communications device,
wherein the method further comprises decoding the uplink data according to the modulation and coding scheme level, and the modulation and coding scheme level is not known by the infrastructure equipment and the uplink data is blindly decoded by the infrastructure equipment.

12. The method according to claim 11, comprising the infrastructure equipment transmitting to the communications device a resource allocation message comprising an indication of downlink communications resources allocated for the transmission of the random access response message combined with a radio network terminal identifier which identifies the infrastructure equipment which transmitted the random access message.

13. The method according to claim 11, comprising the infrastructure equipment signalling to the communications device whether a transmission of the uplink data in Message A of a two-step random access channel (RACH) procedure is supported in a cell associated with the infrastructure equipment.

14. The method according to claim 11, comprising the infrastructure equipment signalling to the communications device whether or not a transmission of the uplink data in Message 3 of a four-step random access procedure (RACH) procedure is supported in a cell associated with the infrastructure equipment.

15. The method according to claim 11, comprising transmitting as broadcast information to at least the communications device system information comprising modulation and coding scheme parameters and a number of physical resource blocks in each of the physical resource block sets for each of the plurality of groups of random access preambles.

16. The method according to claim 15, wherein the broadcast information includes an indication of the first threshold, a second threshold and a third threshold.

17. A non-transitory computer-readable medium encoded with computer-readable instructions that, when executed by circuitry, cause the circuitry to perform the method according to claim 11.

18. Circuitry for transmitting data to a wireless communications network, the circuitry comprising:
transceiver circuitry configured to transmit signals and receive signals to and from a wireless communications network, and
controller circuitry configured in combination with the transceiver circuitry
to determine an amount of uplink data to be transmitted by the communications device to the wireless communications network, and either
to transition to a connected state if the determined amount of the uplink data is greater than a first threshold or, if the determined amount of the uplink data is less than the first threshold,
to select a random access preamble from one of a plurality of groups of random access preambles,
to select modulation and coding for transmitting the uplink data, and
to transmit a random access message on a wireless access interface to the wireless communications network as part of a random access procedure, the random access message including the selected random access preamble from one of the plurality of groups of the random access preambles,
wherein the group of the random access preambles from which the random access preamble is selected is determined according to at least one of an estimate of a transmission path loss for the communications device and the determined amount of the uplink data for transmission, and the modulation and coding for transmitting the uplink data is selected from one or more modulation and coding scheme levels allocated for the determined group of random access preambles,
wherein to determine the amount of the uplink data to be transmitted, the controller circuitry determines an amount of data present in an input buffer, and inflates the size of the determined amount of the uplink data to be transmitted in the input buffer to a size larger than the amount of the uplink data in the input buffer in order to exceed the first predetermined threshold to transition to the connected state.

19. Circuitry for forming part of a wireless communications network, the circuitry comprising:
transceiver circuitry configured to transmit signals and receive signals to and from a communications device, and
controller circuitry configured in combination with the transceiver circuitry to receive a random access message on a wireless access interface provided by the infrastructure equipment as part of a random access procedure, by detecting a random access preamble and uplink data forming part of the random access message, the random access preamble having been selected by the communications device from one of a plurality of groups of random access preambles,
wherein the group of the random access preambles from which the random access preamble was selected by the communications device according to at least one of an estimate of a transmission path loss for the communications device and a determined amount of the uplink data to be transmitted, and a modulation and coding scheme level with which the uplink data was transmitted is associated with the group of random access preambles from which the random access preamble was selected by the communications device, and
wherein the controller circuitry decodes the uplink data according to the modulation and coding scheme level, and the modulation and coding scheme level is not known by circuitry and the uplink data is blindly decoded by the circuitry.

* * * * *